United States Patent
Barrett et al.

(10) Patent No.: US 10,327,113 B2
(45) Date of Patent: *Jun. 18, 2019

(54) DISTRIBUTED CONTROL OF A PUSH-TO-TALK SESSION

(71) Applicant: BlackBerry Limited, Waterloo (CA)

(72) Inventors: Stephen John Barrett, Haywards Heath (GB); Andrew Michael Allen, Hallandale Beach, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,820

(22) Filed: Jul. 17, 2018

(65) Prior Publication Data

US 2019/0014447 A1    Jan. 10, 2019

Related U.S. Application Data

(63) Continuation of application No. 15/224,426, filed on Jul. 29, 2016, now Pat. No. 10,028,110.

(51) Int. Cl.
*H04W 4/10*  (2009.01)
*H04L 29/06*  (2006.01)

(52) U.S. Cl.
CPC ........... *H04W 4/10* (2013.01); *H04L 65/4046* (2013.01); *H04L 65/4061* (2013.01)

(58) Field of Classification Search
CPC .............................. H04W 4/10; H04L 65/4046
See application file for complete search history.

(56) References Cited

U.S. PATENT DOCUMENTS

| 2006/0154681 | A1  | 7/2006  | Park |
| 2007/0133435 | A1  | 6/2007  | Eneroth |
| 2007/0281723 | A1* | 12/2007 | Chotai ................. H04W 76/45 455/518 |
| 2015/0359013 | A1  | 12/2015 | Krizik et al. |
| 2016/0113036 | A1* | 4/2016  | Stephens ............... H04W 76/10 370/312 |
| 2016/0345142 | A1* | 11/2016 | Kashiwase ............ H04W 76/10 |

(Continued)

FOREIGN PATENT DOCUMENTS

| WO | 2009/073332 A1    | 6/2009 |
| WO | 2014210185 A1     | 12/2014 |
| WO | WO-2014210185 A1 * | 12/2014 ............ H04W 76/10 |

OTHER PUBLICATIONS

IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2012, 2793 pages.

(Continued)

*Primary Examiner* — Lewis G West
(74) *Attorney, Agent, or Firm* — Trop, Pruner & Hu, P.C.

(57) ABSTRACT

In some examples, a first push-to-talk (PTT) client that has access to a wide area network (WAN) performs distributed control for a PTT session in conjunction with distributed control for the PTT session performed by another PTT client in the PTT session, the distributed control by the first PTT client performed without use of any PTT server.

18 Claims, 18 Drawing Sheets

(56) References Cited

U.S. PATENT DOCUMENTS

2017/0245123 A1* 8/2017 Baek .................. H04W 4/90

OTHER PUBLICATIONS

3GPP TS 22.179 V13.0.0 (Dec. 2014) Technical Specification 3rd Generation Partnership Project; Technical Specification Group Services and System Aspects; Mission Critical Push to Talk (MCPTT) over LTE; Stage 1 (Release 13) (Dec. 2014) (72 pages).

3GPP TS 22.179 V13.0.1 (Jan. 2015) Technical Specification 3rd Generation Partnership Project; Technical Specification Group Services and System Aspects; Mission Critical Push to Talk (MCPTT) over LTE; Stage 1 (Release 13) (Jan. 2015) (74 pages).

3GPP TS 23.179 V13.2.0 (Jun. 2016) Technical Specification 3rd Generation Partnership Project; Technical Specification Group Services and System Aspects; Functional architecture and information flows to support mission critical communication services; Stage 2 (Release 13) (Jun. 2016) (228 pages).

3GPP TS 23.303 V13.2.0 Technical Specification 3rd Generation Partnership Project; Technical Specification Group Services and System Aspects; Proximity-based services (ProSe); Stage 2 (Release 13) (Dec. 2015) (122 pages).

3GPP TS 23.401 V13.5.0 Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 13) (Dec. 2015) (337 pages).

3GPP TS 24.379 V13.5.0 Technical Specification 3rd Generation Partnership Project; Technical Specification Group Core Networks and Terminals; Mission Critical Push to Talk (MCPTT) call control; Protocol specification (Release 13) (Jun. 2017) (475 pages).

3GPP TS 24.380 V13.5.0 Technical Specification 3rd Generation Partnership Project; Technical Specification Group Core Network and Terminals Mission Critical Push to Talk (MCPTT) media plane control; Protocol specification (Release 13) (Jun. 2017) (241 pages).

3GPP TS 36.300 V13.2.0 Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13) (Dec. 2015) (290 pages).

M. Handley et al., Network Working Group, Request for Comments: 2974, Category: Experimental, Session Announcement Protocol, Oct. 2000 (18 pages).

IEEE Computer Society, IEEE Standard for Information technology—Telecommunications and information exchange between systems—Local and metropolitan area networks—Specific requirements—Part 11: Wireless LAN Medium Access Control (MAC) and Physical Layer (PHY) Specifications, IEEE Std 802.11 2007, Jun. 2007 (1232 pages).

Cisco Systems, Inc., IP Multicast Technology Overview, Dec. 10, 2009 (24 pages).

International Organization for Standardization, https://www.iso.org/news/2008/12/Ref1185.html—ISO/IEC standard on UPnP device architecture makes networking simple and easy, Dec. 10, 2008 (2 pages).

WiFi Alliance, Wi-Fi Peer-to-Peer (P2P) Technical Specification Version 1.5, Aug. 2014 (183 pages).

WiFi Alliance, Wi-Fi Simple Configuration Technical Specification Version 2.0.5, Aug. 2014 (155 pages).

ISA/US, International Search Report and Written Opinion for PCT/US2017/041369 dated Oct. 3, 2017 (10 pages).

European Patent Office, Extended European Search Report for Appl. No. 17834946.0 dated Mar. 15, 2019 (11 pages).

SA WG6 Meeting #1 S6-150021, Sorrento, Italy (revision of 52-144291), Source: Intel, Title: Distributed floor control or MCPTT Direct Mode Operation (DMO), Document for: Approval, Agenda Item: 7.4.3, Work Item/Release: Work Item/ Release: MCPTT / Rel-13, Jan. 26-30, 2015 (6 pages).

3GPP TSG-RAN WG2 #90, Tdoc R2-152393, Fukuoka, Japan, Agenda Item: 7.5.5, Source: Ericsson, Title: Floor control and pre-emption for Prose, Document for Discussion, Decision, May 25-29, 2015 (4 pages).

3GPP TR 23.703 V2.0.0 Technical Report, 3rd Generation Partnership Project; Technical Specification Group Service and System Aspects; Study on architecture enhancements to support, Proximity-based Services (ProSe) (Release 12) (Feb. 2014) (324 pages).

* cited by examiner

DISTRIBUTED CONTROL OF A PUSH-TO-TALK SESSION

CROSS REFERENCE TO RELATED APPLICATIONS

This is a continuation of U.S. application Ser. No. 15/224,426, filed Jul. 29, 2016, which is hereby incorporated by reference.

BACKGROUND

A push-to-talk (PTT) service allows users to engage in one-to-many communications in which permissions are granted to the users to speak in an arbitrated manner. A user can seek permission to speak by pressing a button on a user device or by activating another control element.

BRIEF DESCRIPTION OF THE DRAWINGS

Some implementations of the present disclosure are described with respect to the following figures.

DETAILED DESCRIPTION

Figure 1:
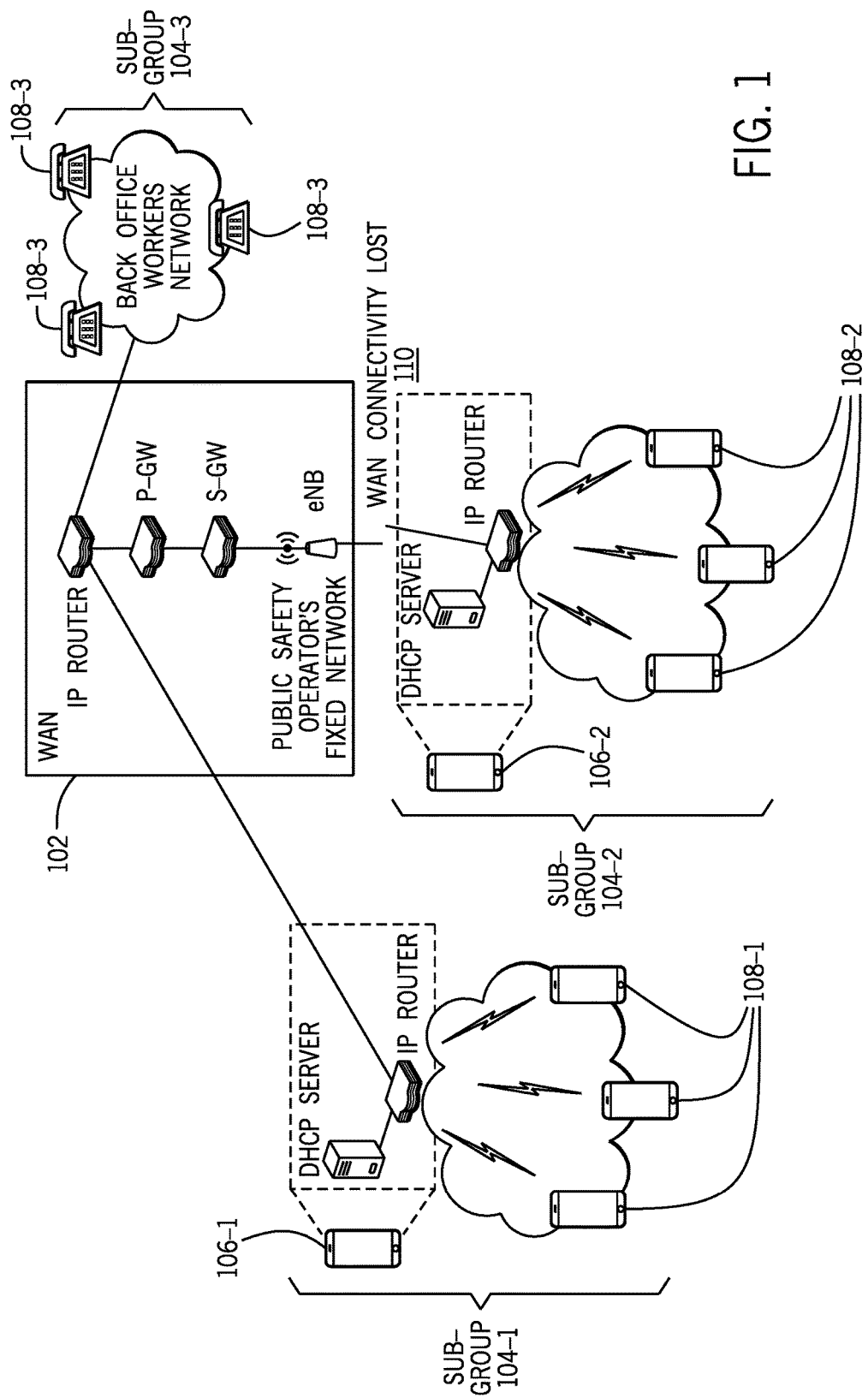
FIG. 1 is a block diagram of an example network arrangement according to some implementations.

Examples of groups of users that can be engaged in push-to-talk (PTT) communications include the following: a group of workers of an organization, members of a team, a group of campers on holiday, a social group, officers of a police department, personnel of a fire department, and so forth. A PTT group can include a group of user devices (associated with respective users) that are able to perform PTT communications with each other. A user device can refer to any electronic device that is capable of participating in PTT communications, such as an electronic device (referred to as a user equipment or UE) connected to a cellular access network, an electronic device connected to wireless local area network, an electronic device that can participate in Wi-Fi Direct communications or other direct device-to-device communications, an electronic device connected to a wired network, and so forth. Examples of user devices include notebook computers, desktop computers, tablet computers, wearable devices (e.g., smart watches, smart eyeglasses, etc.), game appliances, vehicles, and so forth.

In some implementations, a mobile communications network in which a PTT service is provided can operate according to the Long-Term Evolution (LTE) standards as provided by the Third Generation Partnership Project (3GPP). The LTE standards are also referred to as the Evolved Universal Terrestrial Radio Access (E-UTRA) standards. A wireless network that operates according to LTE or E-UTRA can be referred to as E-UTRAN. Although reference is made to LTE or E-UTRA in the ensuing discussion, it is noted that techniques or mechanisms according to some implementations can be applied to other wireless access technologies, such as 5G (fifth generation) technologies or other access technologies.

In an LTE network, one type of PTT service is referred to as a mission critical PTT (MCPTT) service, suitable for mission critical scenarios (such as emergency services including police services, fire department services, etc.). In other examples, PTT services can include non-mission critical PTT services, which can be used by other types of users.

To manage PTT communications, several general categories of control can be performed: (1) group call control, (2) floor control, and (3) traffic data distribution control. Group call control involves establishing, modifying, and deleting a PTT session, as well as performing other tasks, such as negotiating and/or agreeing what audio coder/decoders (codecs) or other resources are to be used for the PTT session.

Floor control involves managing the "floor," i.e., determining which user (speaker) is allowed to speak and send traffic data (including audio data and possibly video data or other types of data) at any given time, and which user will next gain the right to speak (while other user devices are listeners). A first user device can request the right to speak (i.e., request to take the floor), by pressing a physical button on the user device or some other type of control element on the user device (such as a control element on a graphical user interface displayed by the user device).

Traffic data distribution control can refer to determining how traffic data (possibly from multiple user devices) for the PTT session are to be handled upon receipt by a particular user device.

PTT communications can occur among user devices that have access to a wide area network (WAN). A WAN can refer to any network that is external of a particular group of user devices. In some examples, the particular group of user devices can form a local area network (LAN) or can be part of a LAN. A network that is external of the LAN can be referred to as the WAN. An example of a WAN is a public network such as the Internet, a mobile communications network such as a cellular access network (e.g., an LTE access network or other type of wireless access network), and so forth. A WAN generally is a network that allows for geographically distributed user devices (which are geographically distributed outside of a specific local area such as an office environment, a home environment, etc.). PTT communications that occur among user devices that have WAN access (also referred to as WAN connectivity) can be referred to as "on-network" PTT communications. A user device has access to a WAN (i.e., has WAN connectivity) if the user device can directly connect to the WAN or indirectly access the WAN through another device, such as another user device.

In the ensuing discussion, user devices that are part of a PTT group and participating in a PTT communications session can be referred to as PTT clients. Note that the term "PTT client" can refer to a user device, or a PTT application program that executes in the user device.

FIG. 1 shows an example network arrangement that includes a WAN 102 in the form of a cellular access network, such as an LTE access network. In other examples, techniques or mechanisms according to some implementations can be used with other types of WANs. Note that a WAN can also include a network, or multiple networks (e.g., the Internet, an emergency network, a private network, etc.), that are behind and accessible through the cellular access network or other type of network.

As shown in FIG. 1, several PTT sub-groups 104-1, 104-2, and 104-3 of user devices can have access to the WAN 102. If all of the sub-groups 104-1, 104-2, and 104-3 have connectivity to the WAN 102, then the sub-groups 104-1, 104-2, and 104-3 are part of an overall PTT group where the user devices in such a PTT group can communicate with each other in a PTT session. However, in the example of FIG. 1, it is assumed that the PTT sub-group 104-2 of user devices has lost WAN connectivity; in other words, the user devices of the PTT sub-group 104-2 can no longer communicate with the WAN 102. For example, the PTT sub-group 104-2 of user devices may have travelled to a location that is outside of a cellular coverage of a cellular access network. In other examples, other issues may have caused loss of connectivity to the WAN 102, such as equipment failure, program failure, and so forth.

In the example arrangement of FIG. 1, the PTT sub-groups 104-1 and 104-2 can be considered Local Area Radio Communication Groups. A Local Area Radio Communication Group is a group of devices that are connected together wirelessly in a local area network, such as by use of Wi-Fi Direct or another communications protocol and which may not provide access into a WAN.

Wi-Fi Direct is a mechanism for a peer-to-peer (P2P) network built on top of the Institute of Electronics and Electrical Engineers (IEEE) 802.11 wireless local area network (WLAN) protocols. Wi-Fi Direct is also referred to as "Wi-Fi P2P," which is specified by standards provided by the Wi-Fi Alliance (WFA). According to IEEE 802.11 protocol, an AP can be referred to as an AP STA (short for "station"). user devices that communicate with the AP can be referred to as a non-AP STA. Although reference is made to the IEEE 802.11 protocol in some examples, it is noted that communications in a wireless network with APs (more generally wireless access nodes) can operate according to other protocols in other examples. An arrangement of wireless devices that are able to communicate according to Wi-Fi Direct includes a P2P Group Owner (GO) (such as GOs 106-1 and 106-2 in the respective sub-groups 104-1 and 104-2 in FIG. 1) and P2P client devices (such as user devices 108-1 and 108-2 in the respective sub-groups 104-1 and 104-2 in FIG. 1). In terms of behavior at Layers 1 to 3, the GO operates as an AP, though possibly without the availability of backhaul into a WAN, while the client devices operate as non-AP STAs. The differences between Wi-Fi Direct operations and regular IEEE 802.11/Wi-Fi operations include discovery and group formation procedures. Once a Wi-Fi Direct group is formed and operating, the operation of the Wi-Fi Direct group is similar to operation according to IEEE 802.11 in which a traditional fixed AP is used.

The user devices 108-3 in the PTT sub-group 104-3 may have wired connectivity to the WAN 102. As examples, the user devices 108-3 of the sub-group 104-3 can be associated with back office workers that wish to communicate with the user devices of the sub-groups 104-1 and 104-2. In other examples, the user devices 108-3 may have wireless connectivity to the WAN 102.

For PTT communications, the user devices 106-1, 108-1, 106-2, 108-2, and 108-3 are PTT clients. Collectively the PTT clients 106-1, 108-1 of the PTT sub-group 104-1, the PTT clients 106-2 and 108-2 of the PTT sub-group 104-2, and the PTT clients 108-3 of the PTT sub-group 104-3 can be part of a larger PTT group that can engage in PTT communications with respect to each other, assuming each of the PTT sub-groups 104-1 and 104-2 has connectivity to the WAN 102.

Connectivity between PTT clients in a Local Area Radio Communications Group (104-1 or 104-2) and the WAN 102 may come and go (e.g., as coverage conditions of the GO 106-1 or 106-2 in the Local Area Radio Communication Group which is providing the connection into the WAN changes). Generally, it is desired to minimize or reduce service interruption for all PTT clients as WAN connectivity comes and goes and specifically to enable each member of a PTT group to remain in contact with as many other members of the PTT group as is possible even when WAN connectivity of a PTT sub-group (or multiple PTT sub-groups) is lost.

Within each of the PTT sub-groups 104-1 and 104-2, the PTT clients have wireless connectivity to each other, such that they can continue to communicate even if the respective sub-group loses connectivity to the WAN 102.

In the example of FIG. 1, the sub-group 104-2 of PTT clients has lost WAN connectivity (indicated as 110). The PTT clients of the sub-group 104-2 that has lost WAN connectivity can continue to perform PTT communications among each other within the sub-group. This type of PTT communications after loss of WAN connectivity can be referred to as off-network PTT communications. Although examples shown depict use of Wi-Fi Direct among devices within a Local Area Radio Communication Group, it is noted that in other examples, other types of protocols can be used, such as a Proximity Services (ProSe) protocol, as defined by 3GPP TS 23.179. Alternatively, Isolated E-UTRAN Operation for Public Safety (IOPS), as described in Annex K of 3GPP TS 23.401, can also be used by a sub-group in case of loss of WAN connectivity of the sub-group.

ProSe is an off-network distributed protocol that uses a point to multipoint Sidelink Traffic Channel in order to enable one-to-many communications between wireless devices, as described in 3GPP TS 23.303 and 3GPP TS 36.300. Wireless devices that are in range of the transmitting device will receive the transmission. A receiving device can determine whether a received packet should be passed up to its higher layers using a ProSe Layer 2 group identifier (Group ID). If the receiving device is a member of the particular group identified by the ProSe Layer 2 Group ID, then the received packet is passed up to higher layers.

With IOPS operation, a sub-group of PTT clients that have lost WAN connectivity can continue to perform PTT communications with each other using an IOPS-capable wireless access network node. This node includes the functionality of an LTE cellular access network base station, which is known as an eNB and also includes functions of a 3GPP Evolved Packet Core such as those provided by an MME (Mobility Management Entity), S-GW (Serving Gateway) and P-GW (Packet Gateway).

As further shown in FIG. 1, in some examples, each GO 106-1 and 106-2 includes a Dynamic Host Configuration Protocol (DHCP) server and an Internet Protocol (IP) router.

DHCP is a network protocol used on IP networks for dynamically distributing network configuration parameters, such as IP addresses for interfaces and services. An IP router is used to route packets based on IP addresses.

The WAN 102, which is assumed to be a cellular access network in some examples, includes a wireless access network node, which in the context of an LTE cellular access network is an eNB.

The WAN 102 can further include a Serving Gateway (S-GW) and a Packet Gateway (P-GW). The S-GW routes and forwards traffic data packets of a UE served by the S-GW. The S-GW can also act as a mobility anchor for the user plane during handover procedures. The S-GW provides connectivity between a UE and an external network, such as the network of the sub-group 104-3. The P-GW is the entry and egress point for data communicated between a UE in the cellular access network and a network element coupled to an external network.

The WAN 102 can also include an IP router to perform routing of IP packets.

In the example arrangement of FIG. 1 where the PTT sub-group 104-2 has lost WAN connectivity, a control plane or a user plane transmission from a PTT client in the sub-group 104-1 or 104-3 propagates to other user devices within the sub-groups 104-1 and 104-3, but not to user devices of the sub-group 104-2 that has lost WAN connectivity. In addition, a control plane or user plane transmission from a user device in the sub-group 104-2 is propagated to other user devices within the sub-group 104-2, but not to user devices outside the sub-group 104-2 due to loss of the WAN connectivity.

A control plane transmission includes a transmission of a control message (or multiple control messages) relating to control of a PTT session. A user plane transmission includes a transmission of traffic data (including media such as audio and/or video data, and possibly other types of data).

1. Issues Associated with Communications in PTT Sessions

A general issue relating to communications in PTT sessions among PTT clients of a PTT group relates to how changes in availability of WAN connectivity are managed in the context of PTT communications among the PTT clients, while ensuring that each member of the PTT group remains in contact with as many other members of the PTT group as is possible.

Issue Sub-Class #1: Issues Associated with a PTT Group Breaking Up into Multiple Sub-Groups, Such as Due to Loss of WAN Connectivity by a Sub-Group Issue A The ProSe off-network distributed protocol assumes that one PTT client, specifically the current floor holder (i.e., the PTT client associated with the current speaker), takes on a special role of maintaining a floor request queue (storing information relating to Floor Requests from PTT clients who have requested to take the floor). The current floor holder can also be referred to in this disclosure as a "token holder." The token holder is the PTT client that maintains the floor request queue—the remaining PTT clients of the PTT group do not maintain the floor request queue.

This PTT client passes on the floor request queue information (and "token") to the next PTT client in the queue when the media burst of the current floor holder is completed. The term "media burst" can refer to a burst of traffic data transmitted by a PTT client. However, there is an issue with this solution if a PTT group splits into multiple sub-groups, such as due to loss of WAN connectivity. In such case, information about queued Floor Requests would be lost in one of the multiple sub-groups that exist after the split (and no communication path would exist by which the floor request queue information can be passed between the multiple sub-groups). In addition, another issue exists which is that the floor request queue information in the token holder PTT client will have become obsolete, since it may include queued Floor Requests from PTT clients that no longer have connectivity with the communication sub-group that the current token holder is part of.

The issue of having to deal with the loss of a token holder can also occur if the token holder goes out of coverage from the rest of its sub-group.

Issue B

The ProSe off-network distributed protocol does not describe which PTT client is responsible for generating periodic Group Call Announcement messages, nor does it specify which PTT client is responsible for responding to a Group Call Probe message, such as from a new entrant (new PTT client) into the PTT group who has just come into coverage. A Group Call Announcement message includes information that relates to a PTT session, which can be used by a PTT client to discover that a PTT session currently exists, and to join the PTT session. A Group Call Probe message is sent by a user device to determine whether a PTT session is currently in progress. A Group Call Announcement message can be sent by a PTT client in response to the Group Call Probe message.

Solutions should thus be provided to determine which PTT client is responsible for responding to and generating group call messages, including the Group Call Announcement message and the Group Call Probe message. Solutions should be robust to manage the situation where any one PTT client may go in and out of coverage, or may not be available in the sub-group due to WAN connectivity being lost.

Issue Sub-Class #2: Issues Associated with PTT Sub-Groups Merging into a Larger PTT Group, Such as Due to a Sub-Group Regaining WAN Connectivity Issue C The (undesirable) situation in which multiple speakers are speaking at the same time can occur for a number of reasons, such as those set forth below. First, PTT clients of two previously separated sub-groups (of the same PTT group) become connected again when WAN connectivity is restored to a sub-group. The floor holders of the respective sub-groups can continue transmitting media data, even after merging of the sub-groups.

Second, unreliability of floor control messaging can result in there being multiple floor holders.

When multiple speakers are present in a PTT group, PTT clients can receive concurrent media bursts (including voice data) from the multiple speakers.

Issue D

If the ProSe off-network distributed protocol is employed, then when two PTT sub-groups re-merge, an issue can arise that there are now two floor request queue token holders in the merged PTT group—these two token holders can each include a respective floor request queue, which can contain different content. The ProSe off-network distributed protocol is designed to work with there being just one token holder (i.e., just one PTT client with a floor request queue) in a PTT group.

Alternatively, a totally distributed protocol can be used, in which there is no assumption of a PTT client with the special role of a token holder. In this off-network totally distributed protocol, the floor control operation is totally distributed amongst all PTT clients, and no one PTT client takes on the special role of a token holder. However, an issue arises in this context in that the floor request queues of PTT clients in the respective PTT sub-groups that have merged may have different content. This is because PTT clients that were formerly part of one sub-group will not have built the historical record of previously sent Floor Requests from PTT clients that were formerly part of another sub-group.

Floor request queue information can also become unsynchronized across PTT clients because of unreliability of floor control messaging.

The issue thus arises regarding how to manage lack of synchronization between floor control state machines in multiple PTT clients, which can cause the undesirable effect of multiple PTT clients trying to talk (take the floor) at the same time.

Issue E

When multiple PTT sub-groups (e.g., PTT sub-group 1 or PTT sub-group 2) merge due to the restoration of WAN connectivity, the following issue may occur. In a first scenario, a group call was ongoing in only one of the sub-groups (e.g., PTT sub-group 1), and no group call was occurring in another sub-group (e.g., PTT sub-group 2). An issue relates to notifying PTT clients of PTT sub-group 2 (which up to the point of re-merging of the sub-groups have not been engaged in a group call) that there is a group call to which the PTT clients of PTT sub-group 2 can join.

Solutions discussed further below that address Issue E are used to address the issue arising from the first scenario discussed above. Other possible scenarios are discussed below for completeness.

In a second scenario where a group call was ongoing in each of the multiple PTT sub-groups prior to re-merging, it is assumed that the information (e.g., media codec used, bearer bandwidth that is set, etc.) contained in Group Call Announcement messages communicated in each of the multiple PTT sub-groups is the same, to avoid the issue of different information used by different PTT sub-groups. For example, the information relating to a PTT session that is included in Group Call Announcement messages can be pre-configured in the PTT clients and the same settings are used in each of the PTT sub-groups.

In a third scenario, no group calls were ongoing in any of the PTT sub-groups prior to re-merging. In such a scenario, no action has to be performed to announce group call information to the PTT clients of the PTT sub-groups.

Solutions

In general, according to some implementations of the present disclosure, a distributed PTT control technique or mechanism is implemented in PTT clients of a PTT group to address issues arising from loss of WAN connectivity of PTT sub-groups, to assure that a member of the PTT group remains in contact with as many other members of the PTT group as is possible. A distributed PTT control technique refers to a PTT control technique in which control associated with a PTT session is performed individually by the user devices involved in PTT communications, rather than by a centralized PTT server. The distributed PTT control includes any one or a combination of: floor control, control of the PTT session, and management of traffic data of multiple user devices for the PTT session.

Traditionally, in an on-network arrangement in which PTT clients have WAN connectivity, a PTT server (or multiple PTT servers) is (are) used to perform control for a PTT session. A PTT server performs arbitration to determine which of multiple user devices of a PTT group has permission to perform transmission of traffic data. Also, a PTT server is involved in setting up a PTT session, and performing management with respect to the PTT session, as well as tearing down the PTT session.

In accordance with some implementations of the present disclosure, the distributed PTT control technique is implemented in both PTT clients that have WAN connectivity as well as in PTT clients that do not have WAN connectivity. No centralized PTT server or other type of control node is employed to manage the control plane (for communicating control messages relating to a PTT session) or the user plane (for routing traffic data, such as voice data, between PTT clients that are involved in PTT communications) for PTT clients of a given PTT sub-group, such as any of the PTT sub-groups depicted in FIG. 1.

Figure 2:
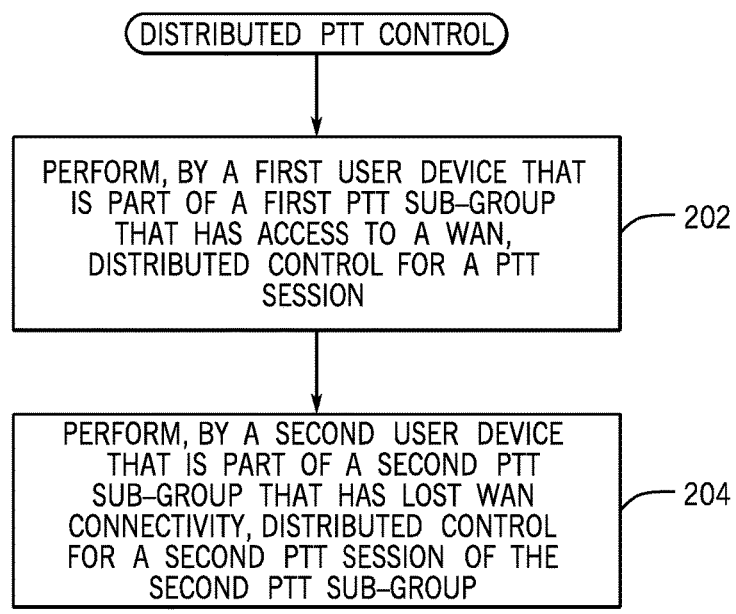
FIG. 2 is a flow diagram of an example process performed by a user device according to some implementations.

FIG. 2 is a flow diagram of an example process that can be performed by user devices (or more generally, PTT clients), such as PTT clients in the arrangement shown in FIG. 1. In the ensuing discussion, although reference is made to user devices, it is noted that techniques or mechanisms according to some implementations can be applied for use with other types of PTT clients. The process includes performing (at 202) by a first user device (such as any of user devices 106-1, 108-1, and 108-3) that is part of a first PTT sub-group that has access to the WAN 102, distributed control for a PTT session, where the distributed control by the first user device is performed without use of any PTT server. The distributed control performed by the first user device that has access to the WAN 102 is performed in conjunction with another user device that has access to the WAN 102 in the PTT session.

In addition, the process of FIG. 2 includes performing (at 204), by a second user device of a second PTT sub-group that has lost WAN connectivity (such as any of user devices 106-2 and 108-2 in the PTT sub-group 104-2 that has lost access to the WAN 102) distributed control for a second PTT session of the second PTT sub-group. The distributed control performed by the second user device is performed in conjunction with distributed control performed by another user device within the second PTT sub-group.

Figure 3:
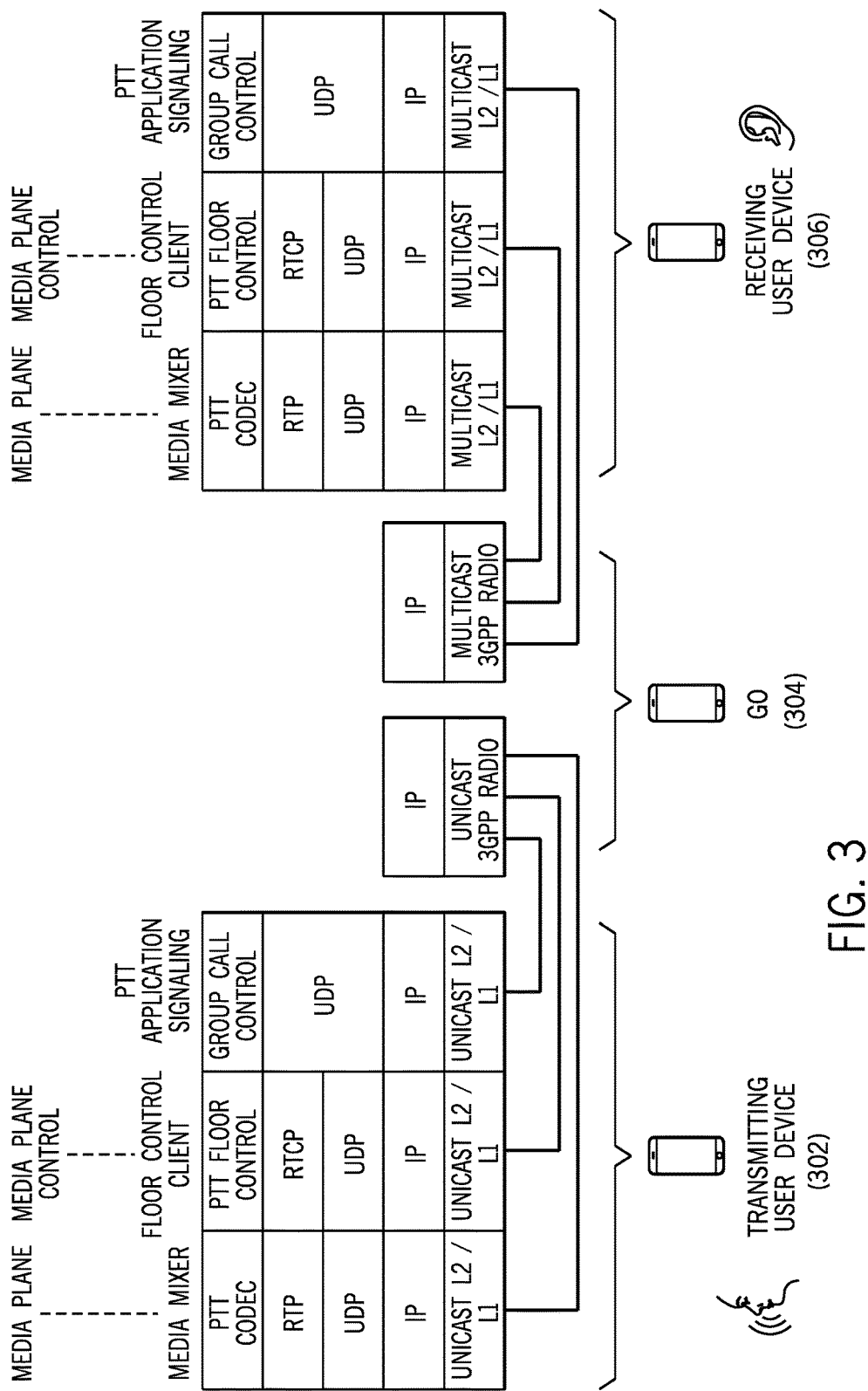
FIG. 3 is a block diagram showing example protocol layers of user devices according to some implementations.

FIG. 3 is a block diagram of an example arrangement that allows for continued PTT communications among members of a fragmented PTT sub-group, such as the PTT sub-group 104-2 of FIG. 1. In the example of FIG. 3, it is assumed that the PTT communications employ Wi-Fi Direct communications, in which an Internet Protocol (IP) multicast transmission from a transmitting user device 302 is passed through a GO 304 to other receiving user devices, including the receiving user device 306 shown in FIG. 3. An example of the GO 304 can be the GO 106-2 of FIG. 1, while examples of the transmitting and receiving user devices 302 and 306 can be user devices 108-2 in FIG. 1.

In FIG. 3, the transmitting user device 302 includes a media plane that communicates media plane traffic data using unicast level 1 (L1) and level 2 (L2) layers, an IP layer, a User Data Protocol (UDP) layer, a PTT codec, and a media mixer application. An L1 layer refers to a physical layer of a device, which includes the physical transceiver to transmit and receive signals. An L2 layer refers to a data link layer, such as a Medium Access Control (MAC) layer. Unicast L1 and L2 layers perform transmission and receiving of data using unicast (one transmitting device sending data to one receiving device).

The media plane control of the transmitting user device 302 uses unicast L1 and L2 layers, an IP layer, a UDP layer, a Real-Time Transport Control Protocol (RTCP) layer (to perform control of Real-Time Protocol or RTP traffic), a PTT Floor Control layer (to communicate floor control messages), and a Floor Control client application (to perform floor control for a PTT session). In addition, the transmitting user device 302 includes a control plane that performs other control for a PTT session (such as setting up the PTT session, tearing down the PTT session, or changing an attribute of the PTT session). The control plane uses unicast L1 and L2 layers, an IP layer, a UDP layer, a group call control layer, and a PTT application signaling layer (to send messages for controlling a PTT session).

The receiving user device 306 includes similar layers as the transmitting UE 302. However, in the receiving user device 306, instead of unicast L2 and L1 layers for the media plane, the media plane control, and the control plane, the receiving user device 306 includes respective multicast L2 and L1 layers. Multicast L2 and L1 layers are used to perform multicast communications, in which a transmitting device sends a message for receipt by multiple receiving devices.

The GO 304 includes a unicast interface to the transmitting user device 302, where the unicast interface includes unicast L1 and L2 layers and an IP layer to perform unicast communications between the transmitting user device 302 and the GO 304. In addition, the GO 304 includes a multicast interface that includes multicast L1 and L2 layers and an IP layer to perform multicast communications between the GO 304 and the receiving user device 306.

In alternative implementations, ProSe communications can occur between the transmitting user device 302 and the receiving user device 306 without use of the GO 304. In such alternative implementations, the transmitting user device 202 is modified to include multicast L1 and L2 layers (in place of the unicast L1 and L2 layers) to allow for multicast communications between the transmitting user device 302 and the receiving user device 306.

2. Solution A.1: Distributed Floor Control

Techniques or mechanisms according to Solution A.1 described in this section can be used to solve Issue A discussed above.

Solution A.1 includes performing distributed flow control among PTT clients of a PTT group, where the PTT group can include all members of an original PTT group prior to any sub-group having lost WAN connectivity, or the PTT group can include a portion of the original PTT group after at least one sub-group has lost WAN connectivity.

In some implementations, a totally distributed control solution is performed by each PTT client of the PTT group, such that all PTT clients in the PTT group run the same control process for managing group call messaging and floor control messaging, and no PTT client takes on a special role, such as the role of token holder discussed above. The totally distributed control solution allows for PTT service continuity as WAN connectivity comes and goes. It is noted that the totally distributed control solution is applied by PTT clients even when they all have WAN connectivity. If a PTT sub-group of the PTT group loses WAN connectivity, then the PTT clients in the PTT sub-group would apply the same distributed control solution. In addition, note that the distributed control solution is applied by the PTT clients of the PTT group regardless of whether the PTT clients are connected wirelessly or in a wired manner.

In some examples, communications among PTT clients in a PTT sub-group can be performed locally at the IP layer (i.e., communications are not via a fixed network).

Floor Request Queues in PTT Clients

Figure 4:
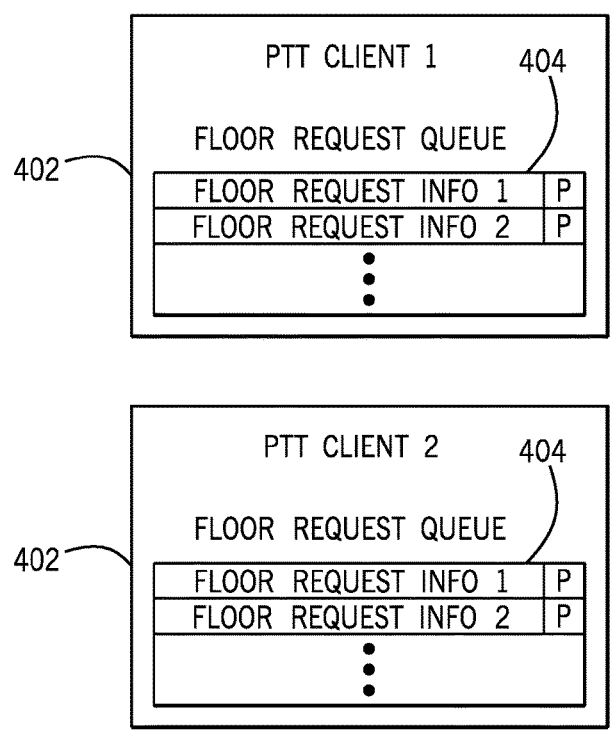
FIG. 4 is a block diagram of example push-to-talk (PTT) clients according to some examples.

FIG. 4 is a block diagram of an example arrangement of PTT clients 402 (PTT client 1 and PTT client 2 shown in the example) that are members of a PTT group. Each PTT client 402 stores a respective floor request queue 404, where the floor request queue 404 of a respective PTT client 402 stores information related to Floor Requests received by the respective PTT client 402, along with priority indications ("P" in FIG. 4) associated with the corresponding Floor Requests. The information related to a Floor Request (referred to as a "Floor Request indication" can include an identifier of the PTT client that submitted the Floor Request, and/or other information contained in the Floor Request or associated with the Floor Request). The priority indications can indicate relative priorities of the Floor Requests in the floor request queue 404. A priority indication can be a flag, field, or other indicator that is settable to a number of different values for indicating respective different priorities.

In implementations of the present disclosure, to employ the same distributed control solution in each PTT client of a PTT group, the floor request queue 404 maintained by a first PTT client 402 is the same as the floor request queue 402 maintained by another PTT client 402. By maintaining the same floor request queue 404 in each of the PTT clients 402 of the PTT group, PTT communications can continue even when one or more of the PTT clients 402 of the PTT group have lost WAN connectivity. With the totally distributed floor control arrangement shown in FIG. 4, there is no one PTT client that has taken on the special role of a token holder that performs arbitration on behalf of other PTT clients within the PTT group. Rather, distributed floor control is performed by the PTT clients 402 using their respective floor request queues 404 for determining which PTT client has the floor in a PTT session. Since no PTT client is assigned the role of a token holder, the issue of the inability to continue PTT communications due to loss of WAN connectivity by this token holder is avoided.

Figure 5:
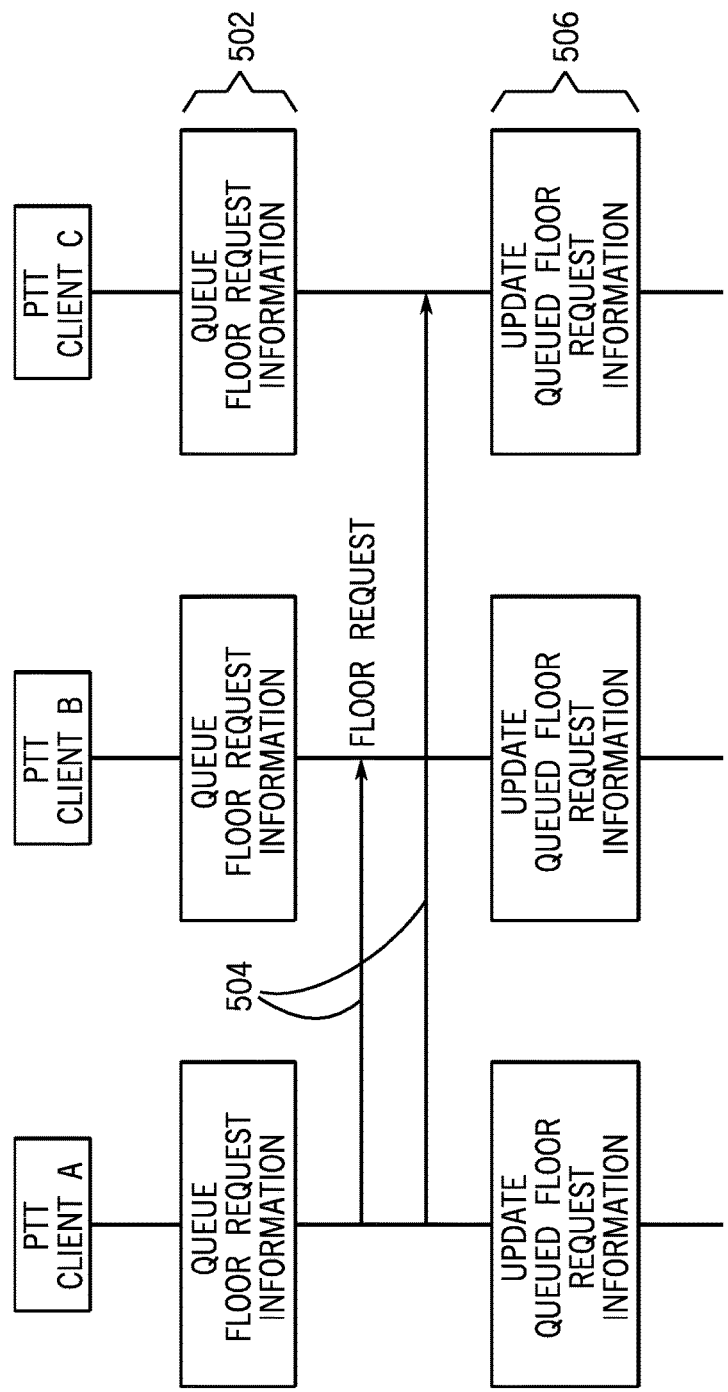
FIGS. 5-8 are flow diagrams of example processes of PTT clients to perform distributed floor control, according to some implementations.

The following describes a process that can be performed by PTT clients according to some examples. As shown in FIG. 5, each of PTT clients A, B, and C stores (at 502) a floor request queue (the floor request queues stored by the PTT clients A, B, and C are identical). As noted above, Floor Request information contained in a floor request queue is associated with a respective priority indication. A PTT client (e.g., PTT client A) wishing to talk uses IP multicast to send (at 504) a Floor Request message to all other PTT clients (e.g., PTT clients B and C) of the PTT group. The Floor Request message can include a priority setting that can be set to one of several different values for indicating a respective priority.

In response to the Floor Request message, each of PTT clients A, B, and C updates (at 506) its respective floor request queue to add the information of the Floor Request message sent (at 504), along with the respective priority indication.

When the current media burst is over (e.g., the current talker releases a push button of a PTT client), each PTT client detects that receipt of traffic data has ceased (such as for a specified time duration). In response, the PTT client who has previously submitted a Floor Request with the highest priority (as indicated by the floor request queue) gets to talk next. Each PTT client A, B, and C can make the determination of which Floor Request has the highest priority independently based on the respective stored floor request queue. The PTT client that detects its Floor Request has the highest priority (based on detecting that the PTT client's identifier in the floor request queue has the highest priority) can take the floor and start transmitting traffic data.

By using the totally distributed control information as discussed above, the loss of WAN connectivity by any of the PTT clients does not result in loss of the queue state information in the PTT group as a whole. This avoids the issue that occurs with 3GPP solutions where the current token holder loses coverage. With the totally distributed control solution according to some examples, since all PTT clients play the same role (e.g., there is no PTT client with a special role such as a token holder), new PTT clients in a PTT sub-group would not have to be assigned to perform such a special role.

To handle the case where multiple Floor Requests have the same priority in the floor request queue, an algorithm can be defined to further rank the same priority Floor Requests. In some examples, such ranking can be according to any or some combination of the following:

- The ranking of the same priority Floor Requests can be based on a timestamp included in the Floor Request messages. An earlier Floor Request has a higher rank than a later Floor Request. Timestamps associated with each Floor Request can be stored with each entry in the floor request queue. Such timestamps of the same priority Floor Requests can be compared to identify earlier timestamps.
- The ranking of the same priority Floor Requests can be based on a source identifier (e.g., an IP address, a Wi-Fi MAC address, a ProSe UE ID, etc.), which identifies the PTT client that transmitted the Floor Request. A higher source identifier value is ranked higher in the floor request queue. In other examples, a lower source identifier value is ranked higher in the floor request queue. (Solution C.2 discussed further below provides an example of how source identifiers of PTT clients can be used to perform ranking).
- The ranking of the same priority Floor Requests can be based on a randomly drawn number that is included with each Floor Request information included in the floor request queue. The randomly drawn numbers can be compared to determine which Floor Request has a higher ranking; e.g., a higher random number can indicate a higher ranking.

Obsoleted Floor Control State Machines

Solutions are also provided for handling the case that floor request queue information becomes obsoleted when a PTT group splits into multiple PTT sub-groups. In this scenario, floor control state machines in the PTT clients may no longer be relevant or applicable. This is because a floor control state machine in a PTT client of a first PTT sub-group may contain queued Floor Request information of PTT clients that are now part of a second PTT sub-group. A "floor control state machine" can refer to the combination of the floor request queue and the logic used in a PTT client to perform floor control based on the floor request queue.

A first solution to address the obsolescence of a floor control state machine is based around the use of timers; if there is no media burst forthcoming from the PTT client who is at the head of the floor request queue (e.g., the PTT client having the highest priority in the floor request queue) for a specified time period, then the next PTT client in the floor request queue (e.g., the PTT client with the next highest priority in the floor request queue) is promoted to the head of the floor request queue.

In a second solution, failure of N (N PTT clients to initiate transmission of a media burst results in a deletion of all queue information in the floor request queue, and a re-sending of Floor Request messages.

In a third solution, a ping mechanism is used between a PTT client in a Local Area Radio Communication Group and a PTT client having a wired connection to the WAN 102, in which ping messages can be transmitted (e.g., periodically or at other intervals) between PTT clients. Failure of PTT clients to receive a ping message indicates loss of WAN connectivity—in response, the PTT clients can trigger the resetting and rebuilding of the floor request queues.

With the first solution, each PTT client can keep its respective floor request queues, but use of timers in the PTT clients allow floor control to proceed to the next PTT client when the PTT client with the highest priority (as indicated by the priority indications in the floor request queue) does not take the floor. With this first solution, PTT clients that are no longer part of the PTT sub-group can gradually be removed from the floor request queues.

Figure 6:
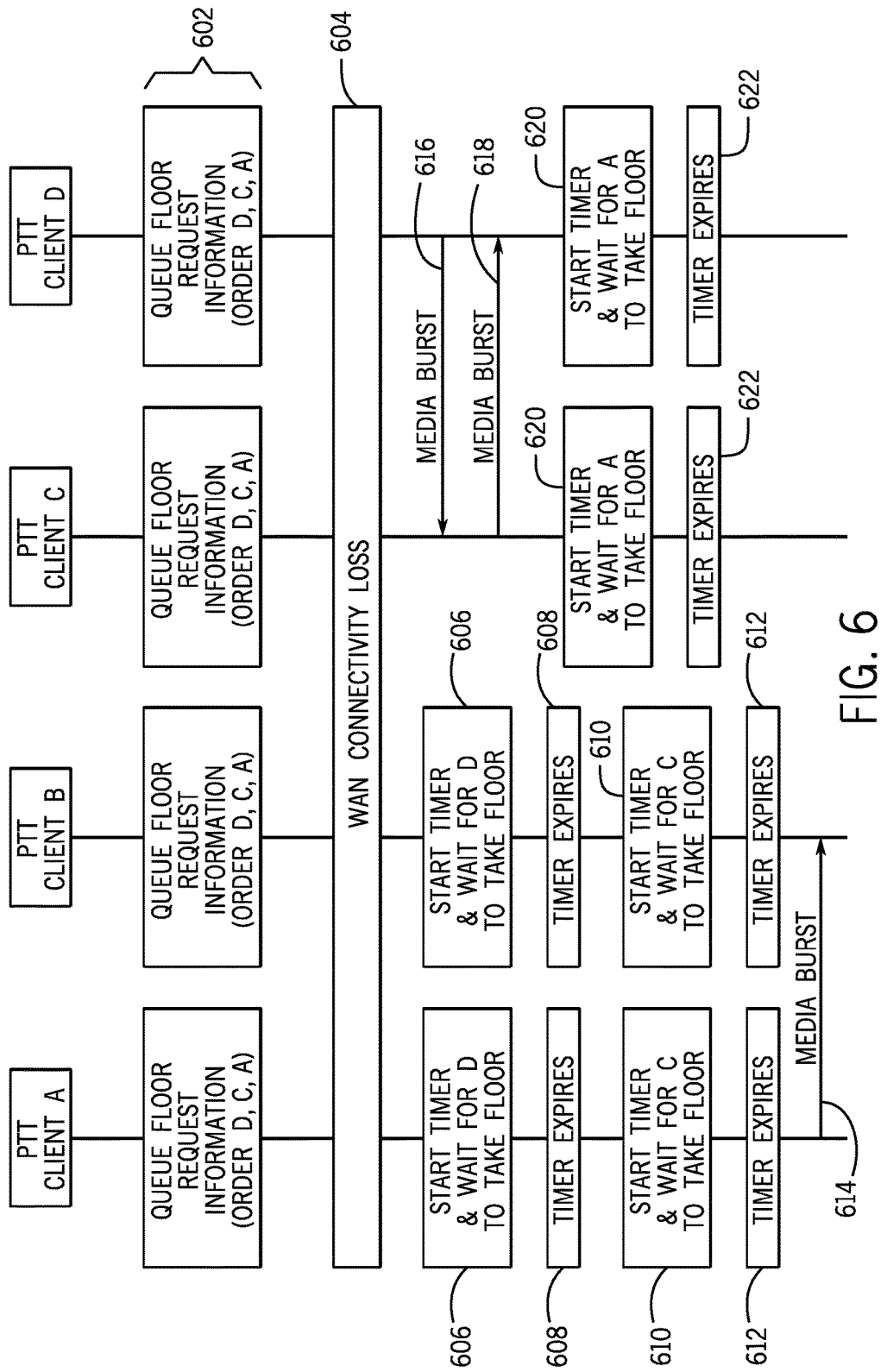

FIG. 6 illustrates an example of the use of the first solution discussed above.

Task 602: PTT clients A, B, C, D are all initially connected to one another (part of the same PTT group) and all maintain the same floor request queue information, which includes priority indications indicating the following relative priorities: D (highest priority), C, A (lowest priority).

Task 604: Due to WAN connectivity loss, PTT clients A and B are part of a first PTT sub-group (and are connected to one another), while PTT clients C and D are part of a second PTT sub-group (and are connected to one another). However the first and second PTT sub-groups are not connected to one another.

Tasks 606 to 614 below are tasks performed in the first PTT sub-group (including PTT clients A and B).

Task 606: PTT clients A and B each starts a respective timer and waits for PTT client D (which is next in the floor request queue) to take the floor.

Task 608: The timers expire. In response, PTT clients A and B determine that PTT client D will not be taking the floor.

Task 610: PTT clients A and B each starts a timer and waits for PTT client C (which is next in the floor request queue) to take the floor.

Task 612: The timers expire. In response, PTT clients A and B determine that PTT client C will not be taking the floor.

Task 614: PTT client A, which is the next PTT client in the floor request queue, takes the floor and transmits its media burst to other PTT client(s) in the first PTT sub-group, including PTT client B.

Tasks 616 to 622 below are tasks performed in the second PTT sub-group (including PTT clients C and D).

Task 616: PTT client D is next in the floor request queue, hence it transmits its media burst to the other PTT clients in the second PTT sub-group (including PTT client C).

Task 618: PTT client C is next in the floor request queue. After the media burst of PTT client D ceases, PTT client C transmits its media burst to the other PTT clients in the second PTT sub-group (including PTT client D).

Task 620: After the media burst from PTT client C ceases, PTT clients C and D each starts a timer and waits for PTT client A (which is next in the floor request queue) to take the floor.

Task 622: The timers expire. In response, PTT clients C and D determine that PTT client A will not be taking the floor.

In further examples, the second solution can be performed as discussed above. In the second solution, when N (N 1) PTT clients in the floor request queue have failed to take the floor during a specified time duration T (T being zero or greater than zero), this triggers all PTT clients in a PTT sub-group to reset their floor control state machines (including deleting or marking as invalid the respective floor request queues), and to re-send any pending Floor Requests that they may have, so that all PTT clients can build fresh floor request queues.

Figure 7:
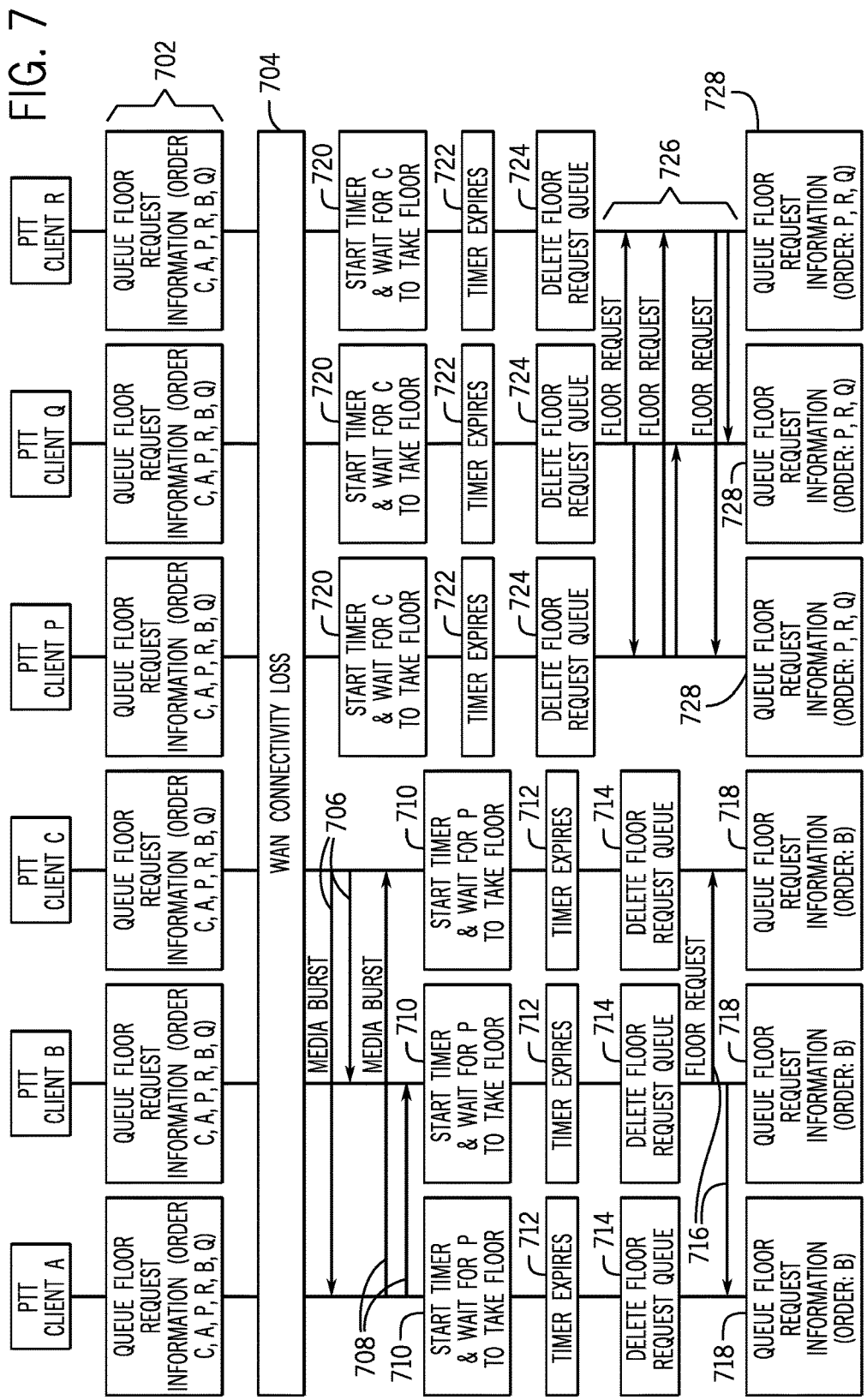

FIG. 7 shows an example of the modified first solution, in which N=1.

Task 702: PTT clients A, B, C, P, Q, and R are all initially connected to one another (part of the same PTT group) and all have the same floor request queue information, which includes priority indications indicating the following relative priorities: see (highest priority), A, P, R, B, Q (lowest priority).

Task 704: Due to WAN connectivity loss, PTT clients A, B, C are part of a first PTT sub-group (and are connected to one another), while PTT clients P, Q, and R are part of a second PTT sub-group (and are connected to one another). However, the first and second PTT sub-groups are not connected to one another.

Task 706 to 718 are tasks performed in the first PTT sub-group (including PTT clients A, B, C).

Task 706: PTT client C (which is the next PTT client in the floor control queue) transmits its media burst to the other PTT clients (in the first PTT sub-group) (including PTT clients A and B).

Task 708: After the media burst from PTT client C ceases, PTT client A (which is the next PTT client in the floor control queue) transmits its media burst to the other PTT clients in the first PTT sub-group (including PTT clients B and C).

Task 710: After the media burst from PTT client A ceases, PTT clients A, B, and C each starts a timer and waits for PTT client P (the next PTT client in the floor control queue) to take the floor.

Task 712: The timers expire. In response, PTT clients A, B, and C each deletes (or marks as invalid) its respective floor request queue.

Task 716 after deleting or marking as invalid the floor request queues, each PTT client in the first PTT sub-group that has a Floor Request sends the Floor Request to the other PTT clients in the first PTT sub-group. In the example of FIG. 7, this PTT client is PTT client B.

Task 718: PTT clients A, B, and C each updates its floor request queue with information related to the received Floor Request. In this example, only one PTT client (PTT client B) has sent a Floor Request, and as a result, the floor request queue in each PTT client includes information related to the Floor Request of PTT client B.

Task 720 to 728 are tasks performed by the PTT clients in the second PTT sub-group.

Task 720: PTT clients P, Q, and R each starts its timer and waits for PTT client C (the next PTT client in the floor control queue) to take the floor.

Task 722: The timers in PTT clients P, Q, and R expire because PTT client C is not part of the second PTT sub-group.

Task 724: In response to expiration of the timers, PTT clients P, Q, and R each delete or mark as invalid its respective floor request queue.

After task 726: After deleting or marking as invalid their respective floor request queues, PTT clients P, Q, and R re-send their respective Floor Requests to other PTT clients in the second PTT sub-group.

Task 728: In response to the Floor Request, PTT clients P, Q, and R store the information related to such Floor Request in their respective floor request queues, with the following order: P, R, Q.

In further examples, the third solution as discussed above can be used. The third solution uses a ping mechanism, or another type of mechanism, to allow PTT clients to determine if WAN connectivity between PTT clients on a fixed network and PTT clients in a Local Area Radio Communication Group has been lost. If such WAN connectivity is lost, then the PTT client(s) that has (have) detected the WAN connectivity loss can send a Floor Control Reset message to request all PTT clients (in a respective PTT sub-group) to reset their floor control state machines, and to re-send any Floor Request that each PTT client may have, so that the PTT clients can build fresh floor request queues.

Figure 8:
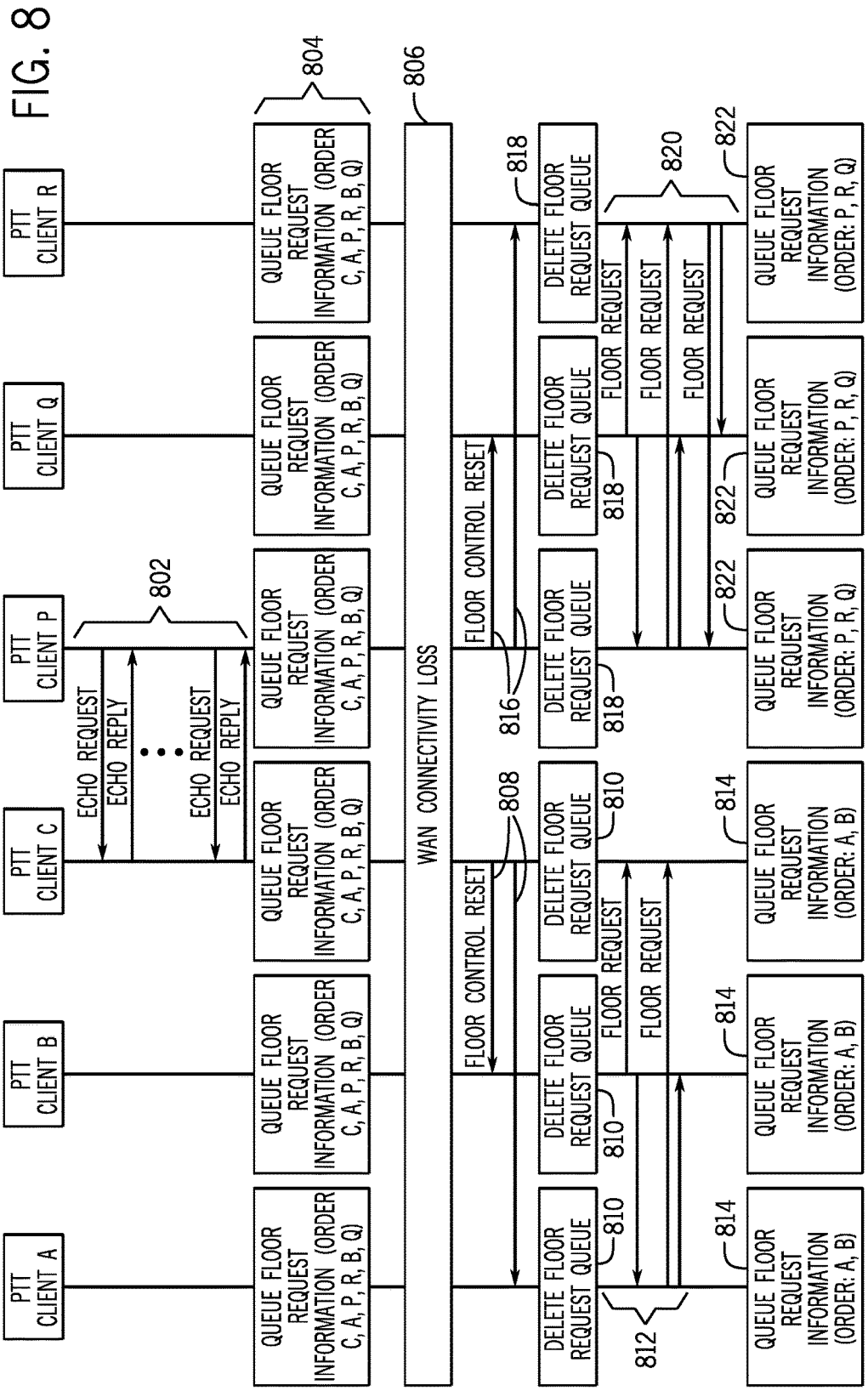

FIG. 8 illustrates an example of the third solution. It is assumed that PTT clients A, B, and C are part of a Local Area Radio Communication Group (a PTT sub-group where PTT clients are wirelessly connected), and PTT clients P, Q, and R are connected to a fixed network (e.g., have a wired connection to the WAN 102, such as the PTT clients of the PTT sub-group 104-3 in FIG. 1). In the ensuing discussion, the Local Area Radio Communication Group including PTT clients A, B, and C are referred to as a first PTT sub-group, and the PTT clients P, Q, and R on the fixed network are part of a second PTT sub-group.

Task 802: In some examples, PTT client P in the second PTT sub-group and PTT client C in the first PTT sub-group can take on the role of supporting a ping mechanism so that both PTT clients P and C can ascertain when WAN connectivity has been lost. Ping messages can be sent periodically or at other intervals. In some examples, a ping message can include an Internet Control Message Protocol (ICMP) Echo Request, and a ping response to the ping message can include an ICMP Echo Reply. In the Local Area Radio Communication Group (i.e., the first PTT sub-group), the PTT client providing the WAN connectivity to the group (e.g., the Wi-Fi Direct GO) can take on the role of sending and responding to ping messages. In the fixed network (i.e., the second PTT sub-group), any PTT client can take on the role of sending and responding to ping messages.

In the ensuing discussion, a PTT client that takes on the role of sending and responding to ping messages can be referred to as a "pinging PTT client." In some examples, the pinging PTT client in the first PTT sub-group (a Local Area Radio Communication Group) can learn the IP address of the ping PTT client in the second PTT sub-group. For example, the IP address can be preconfigured or the IP address can be determined using domain name system (DNS) lookup using a fully qualified domain name (FQDN) that is pre-configured. Failure of a pinging PTT client to receive an Echo Reply in response to a transmitted Echo Request is an indication that WAN connectivity had been lost.

Task 804: PTT clients A, B, C, P, Q, R are all initially connected to one another (part of the same communication group) and all have the same floor control queue information. The priorities of the PTT clients are in the following order: C (highest priority), A, P, R, B, Q (lowest priority).

Task 806: Due to WAN connectivity loss, PTT clients A, B and C are part of the first PTT sub-group (and are connected to one another), and PTT clients P, Q and R are part of the second PTT sub-group (and are connected to one another). However the communication sub-groups are not connected to one another.

Tasks 808 to 814 below are tasks performed in the first PTT sub-group (including PTT clients A, B, and C).

Task 808: The pinging PTT client (C) determines that WAN connectivity has been lost (because PTT client C did not receive an Echo Reply in response to a transmitted Echo Request), and in response, sends a Floor Control Reset message to all PTT clients in the first PTT sub-group. The Floor Control Reset message can be sent using an IP multicast address.

Task 810: In response to the Floor Control Reset message, PTT clients A, B, and C in the first PTT sub-group each deletes or marks as invalid its floor request queue.

Task 812: PTT clients in the first PTT sub-group that wish to take the floor re-send their Floor Requests to the other PTT clients in the first PTT sub-group.

Task 814: All PTT clients in the first PTT sub-group update their floor request queues to include information associated with the re-sent Floor Requests (with order A, B).

Tasks 816 to 822 below are tasks performed in the second PTT sub-group (including PTT clients P, Q, R). Tasks 816 to 822 are similar to tasks 808 to 814, but are performed by the PTT clients P, Q, and R of the second PTT sub-group.

In other examples, a ping mechanism is not used by the PTT clients in the third solution. Instead, a PTT client (e.g., Wi-Fi Direct GO) in the Local Area Radio Communications Group that is aware of loss of WAN connectivity can proceed with the procedure discussed above. However, PTT clients on the fixed network would not be made aware of the loss of WAN connectivity and would have to use one of the other solutions described in this section (e.g., the first or second solution).

3. Solution B.1: Totally Distributed Group Call Message Handling

Techniques or mechanisms according to Solution B.1 can be used to address Issue B discussed above.

A "group call message" can refer to any control message that can be used to set up a PTT session, modify a PTT session (such as to allow a new PTT client to join the PTT session), tear down a PTT session or inquire about an ongoing PTT session. In examples discussed below, a group call message can refer to a Group Call Probe message or a Group Call Announcement message, as examples.

In a totally distributed control solution according to some implementations of the present disclosure, all PTT clients can be responsible for sending Group Call Announcement messages, such as periodically or in response to other events (these may be repeats of an original Group Call Announcement). Also, all PTT clients can respond to any Group Call Probe message (from a new entrant to a PTT group, which may just have come into radio coverage and wish to receive the group call information).

With solution B.1, any PTT client in a PTT group can generate or respond to group call messaging. However, in some implementations, to reduce signaling traffic, it is additionally proposed that PTT clients be configured to respond to and/or produce group call messages in some time order, but with the extra proviso that once at least one other PTT client has sent a group call message (e.g., a Group Call Announcement message), then other PTT clients would not do so. A scheme for achieving this is described further below based on performing a modulo operation on an identifier associated with each PTT client, with the result of the modulo operation being used to determine a time offset at which that PTT client will send its group call message (but only if the PTT client is not beaten to it by another PTT client in a PTT sub-group).

Figure 9:
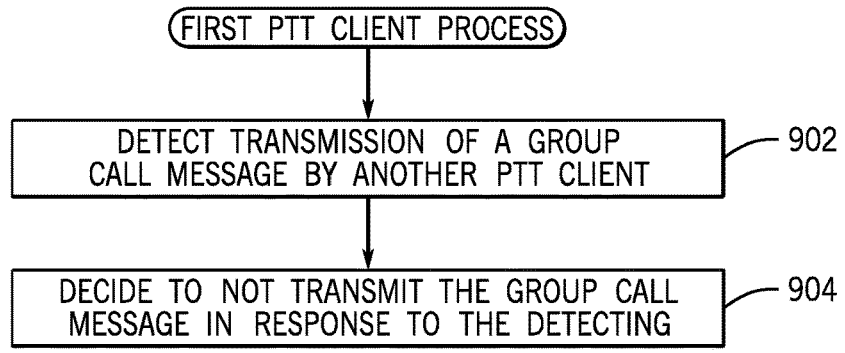
FIGS. 9 and 10 are flow diagrams of example processes of a PTT client to perform group call control, according to some implementations.

FIG. 9 is an example of a flow diagram that can be performed by a first PTT client according to some implementations. The first PTT client detects (at 902), transmission of a group call message by another PTT client in a PTT group (which can be the overall PTT group or a PTT sub-group after loss of WAN connectivity). The first PTT client decides (at 904) to not transmit the group call message in response to the detecting.

Figure 10:
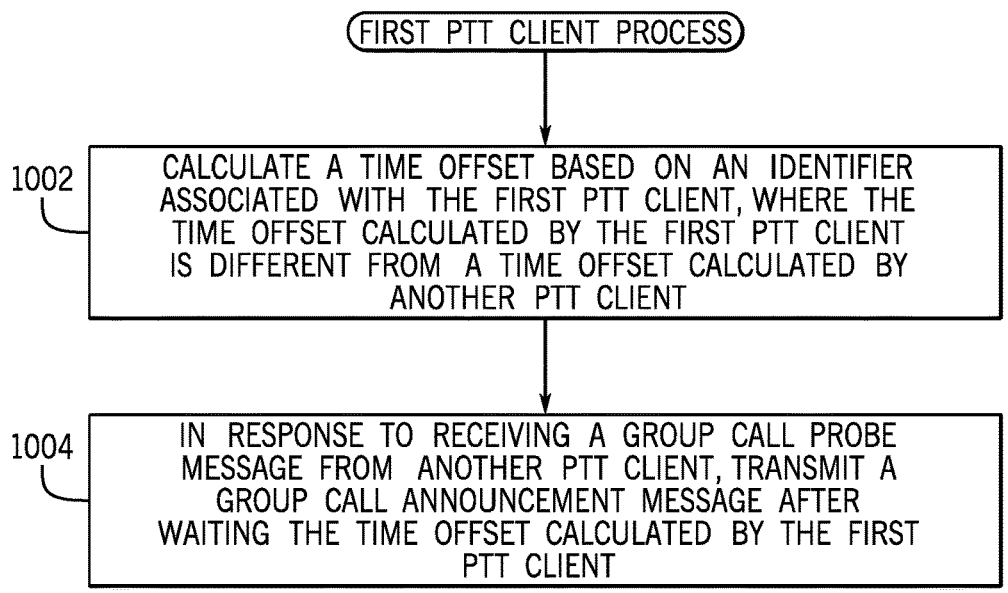

FIG. 10 is a flow diagram of an example process that can be performed by a first PTT client. The first PTT client calculates (at 1002) a time offset based on an identifier associated with the first PTT client, where the time offset calculated by the first PTT client is different from a time offset calculated by another PTT client in the PTT group. In response to receiving a Group Call Probe message from another PTT client, the first PTT client transmits (at 1004) a Group Call Announcement message after waiting the time offset calculated by the first PTT client.

The following describes a technique to calculate a time offset (such as in task 1002) according to some examples. The time offset can be calculated as follows:

Time offset=(Numerical_ID modulo $M$)*Time_offset_step.

$M$ ($M>1$) determines the number of different time offsets that will be computed. Hence if for example there are 20 PTT clients in a PTT sub-group and M=5, and if Time_offset_step=10 milliseconds (ms), then on average it can be expected that:

four PTT clients compute Time offset=0 ms,
four PTT clients compute Time offset=10 ms,
four PTT clients compute Time offset=20 ms,
four PTT clients compute Time offset=30 ms, and
four PTT clients compute Time offset=40 ms.

To determine an absolute time of transmission of a Group Call Announcement message, the time offset can be applied with respect to either:

1) the time at which a Group Call Probe message was received (from a new entrant to a PTT group), or
2) the time at which a periodic Group Call Announcement is to be transmitted. This can be measured by all PTT clients with respect to the time of the last periodic Group Call Announcement message, where the period to the next periodic Group Call Announcement message (e.g., 100 ms) is carried in the preceding Group Call Announcement message.

Any identifier or parameter that is unique to a PTT client in a PTT sub-group can be used as Numerical_ID (e.g., ProSe UE ID, 802.11 MAC address, MCPTT ID, International Mobile Subscriber Identity, IP address, etc.). If an identifier or parameter unique to a PTT client is not a numerical value, the identifier or parameter can be converted to a numerical value. An example of such a conversion is discussed further below in connection with Solution C.2, which describes converting an IP address into a numerical value. Similarly, textual identifiers such as an MCPTT uniform resource identifier (URI) can be converted to numerical values using ASCII codings to convert characters into numbers.

Figure 11:
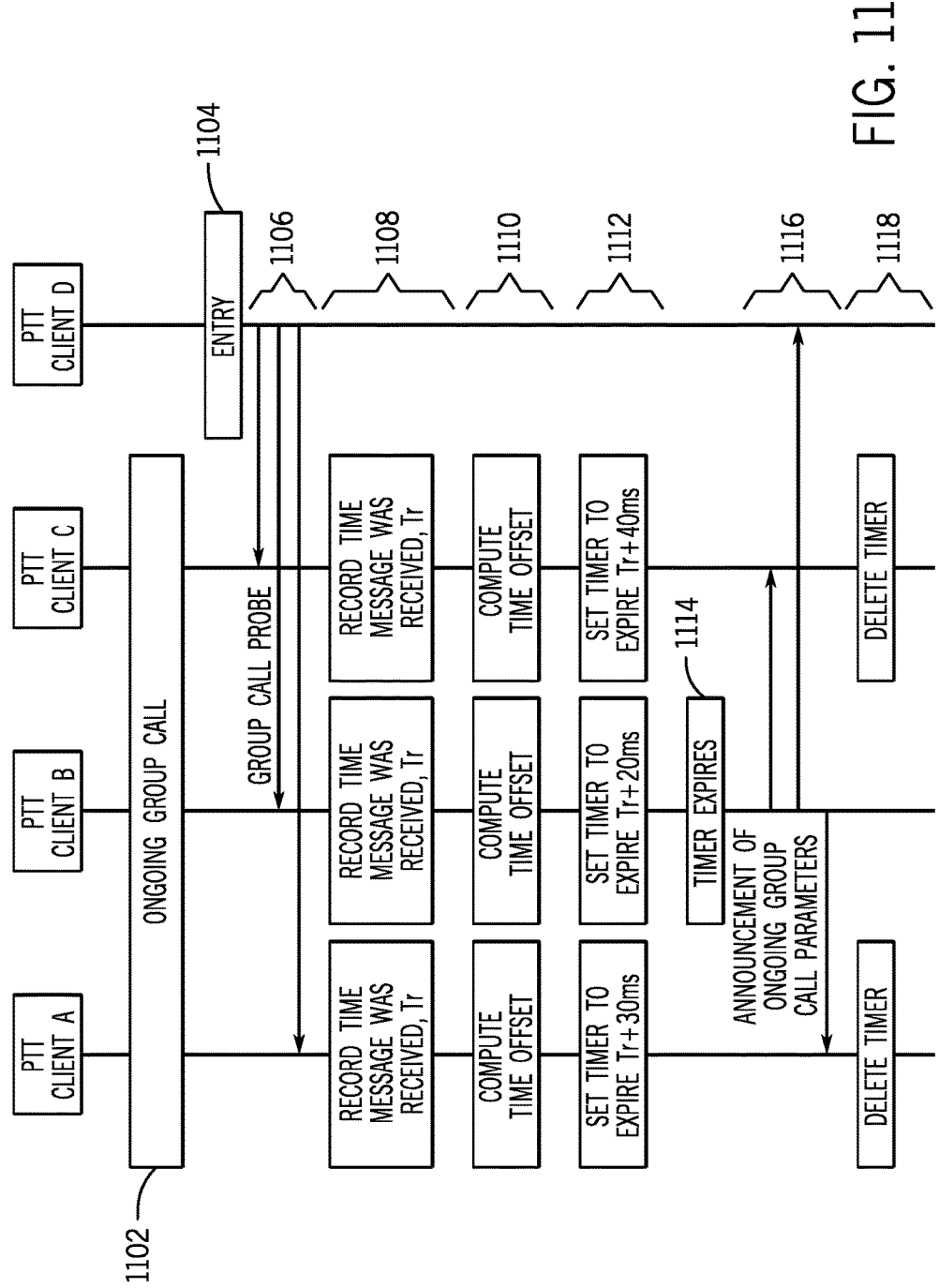
FIG. 11 is a flow diagram of an example process of PTT clients for group call control, according to further implementations.

FIG. 11 is a flow diagram of an example process according to some implementations that can be performed by PTT clients A, B, and C, which are part of a PTT group (an overall PTT group or a PTT sub-group).

Task 1102: There is an ongoing group call (a PTT session) between PTT clients A, B and C.

Task 1104: PTT client D enters into coverage of the PTT group and determines that a group call is in progress. It may do this by spotting that a Layer 2 identity associated with the group is in use, such as a ProSe Layer 2 Group identity, or an Ethernet multicast MAC address.

Task 1106: PTT client D multicasts a Group Call Probe message to trigger a recipient PTT client into supplying details of the ongoing group call.

Task 1108: PTT clients A, B and C record the time (Tr) that the Group Call Probe message was received.

Task 1110: PTT clients A, B and C compute a Time offset parameter according to the algorithm described above. For example, the Time offset parameter for PTT client A is 30 ms, the Time offset parameter for PTT client B is 20 ms, and the Time offset parameter for PTT client A is 40 ms.

Task 1112: PTT clients A, B and C set timers to expire at Tr+Time offset.

Task 1114: The timer of PTT client B expires first.

Task 1116: PTT client B multicasts a Group Call Announcement message, which includes parameters of the group call. The new entrant, PTT client D, receives the Group Call Announcement message, and is able to determine information of the ongoing group call from the Group Call Announcement message.

Task 1118: PTT clients A and C reset their timers and do not send any Announcement of Group Call messages.

In further examples, a similar technique can be used for determining which PTT client is to respond to a Floor Queue Status Request message, when there is a new entrant into a PTT group. A Floor Queue Status Request message triggers a PTT client into transmitting information of a floor request queue.

4. Solutions C.1 and C.2: Managing Simultaneous Media Burst when Communication Sub-Groups Re-Merge Solutions C.1 and C.2 can be used to address Issue C discussed above.

With Solution C.1, a receiving PTT client determines that over-talking (when multiple PTT clients are transmitting traffic data concurrently) has started to occur when the receiving PTT client starts receiving traffic data (e.g., voice data) on a destination IP multicast address (or other destination network address) of a PTT group (an overall PTT group or a PTT sub-group), but the source IP address (or other source network address) of the received traffic data is not correlated with the receiving PTT client's record of the current floor holder. In other words, the receiving PTT client expects to receive traffic data of the current floor holder, but the received traffic data includes a source IP address indicating that another PTT client (not the current floor holder expected by the first PTT client) is transmitting. In this case, the IP packets associated with the un-correlated source IP address are discarded by the receiving PTT client until the expected current floor holder relinquishes the floor or ceases to provide any more traffic data packets.

In Solution C2, when over-talking occurs (due to concurrent traffic data transmissions by multiple transmitting PTT clients), a receiving PTT client starts discarding packets arriving from a lower priority transmitting PTT client(s). In further examples, a lower priority transmitting PTT client can autonomously detect that it is of lower priority than another transmitting PTT client, and can use this information to cease transmission.

Figure 12:
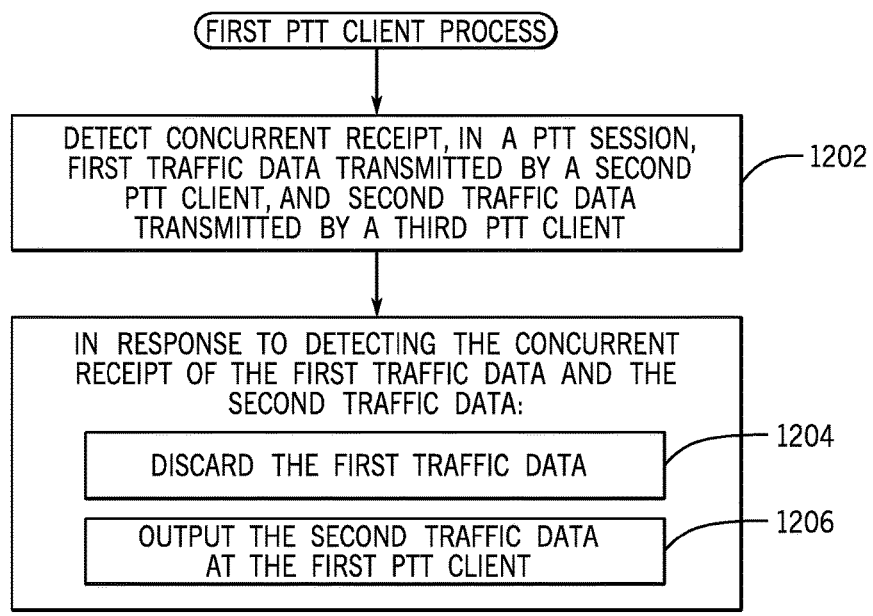
FIG. 12 is a flow diagram of an example process for managing concurrent traffic data bursts in response to re-merging of sub-groups into a PTT group, according to some implementations.

A process that can be performed by a first PTT client according to either Solution C.1 or C.2 is depicted in FIG. 12. The first PTT client detects (at 1202) concurrent receipt, in a PTT session, first traffic data (e.g., voice data) transmitted by a second PTT client, and second traffic data (e.g., voice data) transmitted by a third PTT client. In response to detecting the concurrent receipt of the first traffic data and the second traffic data, the first PTT client discards (at 1204) the first traffic data, and outputs (at 1206) the second traffic data at the first PTT client.

The discarding of the first traffic data can be in response to one of several different conditions. In some examples, the discarding of the first traffic data is in response to determining that the first traffic data includes an identification that is not an identification of a current floor holder. When a first PTT sub-group merges with a second PTT sub-group, each of the first and second PTT sub-groups can include a current floor holder, such that PTT clients in the merged PTT group that includes the first and second PTT sub-groups can receive simultaneous traffic data transmitted by the respective current floor holders of the first and second PTT sub-groups. The identification of a current floor holder can include a source IP address of the current floor holder or a source MAC address of the current floor owner. Thus, from the perspective of a receiving PTT client, if traffic data includes an identification (e.g., source IP address or source MAC address) that is not the identification of the current floor holder, then the receiving PTT client discards that traffic data. In other examples, the source identification to identify a transmitting PTT client can be a ProSe Layer 2 Group ID or a ProSe UE ID.

In other implementations according to Solution C.2, the discarding of the first traffic data is in response to determining that the first traffic data is from the second PTT client that is associated with a lower priority than a priority associated with the third PTT client.

Solution C.1

In response to restoring of the WAN connectivity of a first PTT sub-group, PTT client X in the first PTT sub-group may have been in the middle of a media burst (having won the floor in the first PTT sub-group) while at the same time PTT client Y, which is member of the same overall PTT group, but which is part of a second PTT sub-group that is connected into the WAN, may also have been in the middle of a media burst.

When WAN connectivity is restored, PTT clients of both the first and second PTT sub-groups may continue to receive the full media burst communications of both PTT client X and PTT client Y. The receiving PTT client can inspect both the source IP address and destination IP multicast address of each received traffic data packet. The destination multicast IP address is what associates transmissions with a particular PTT group, and the source IP address is what identifies a transmitting PTT client.

Figure 13:
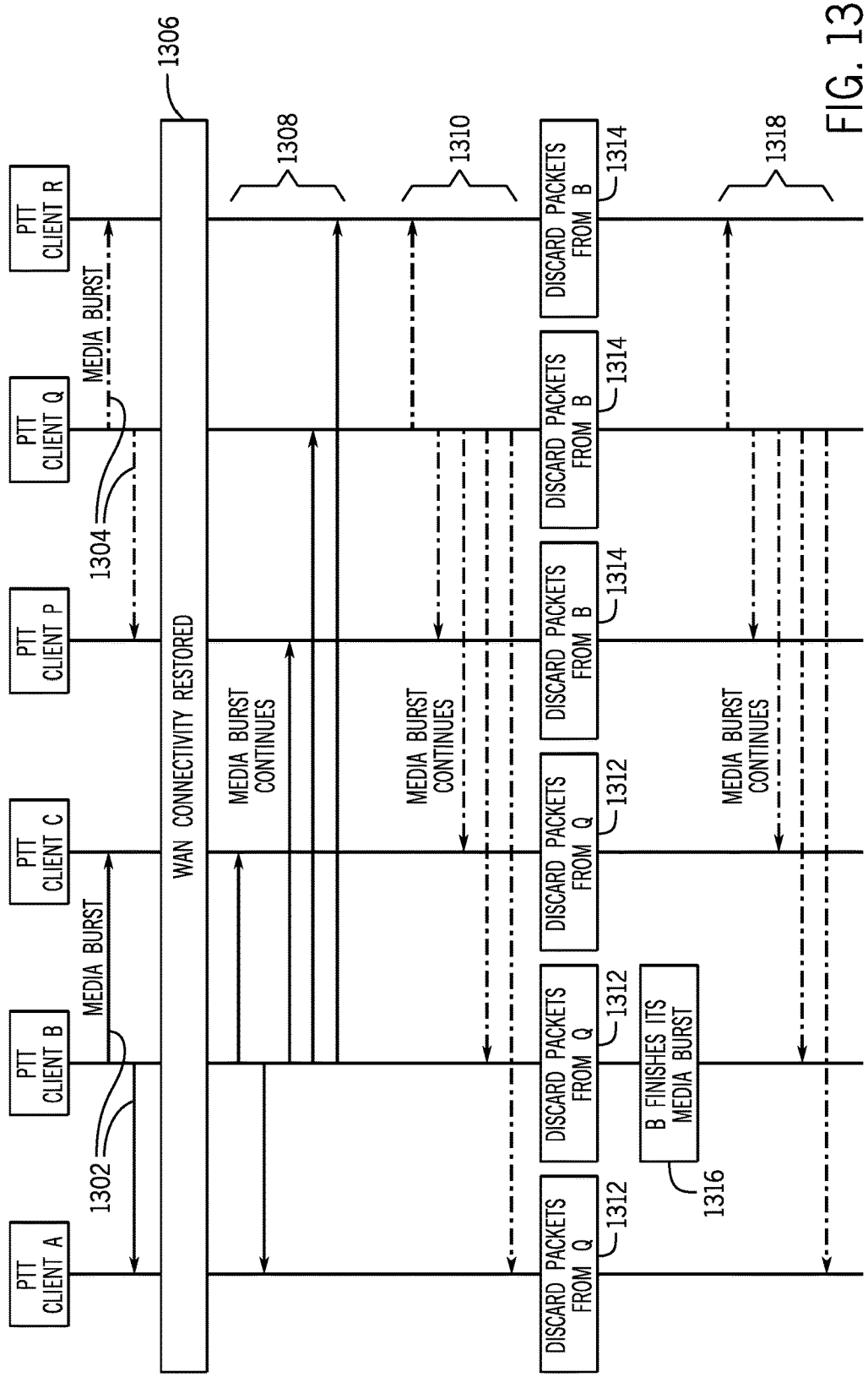
FIGS. 13-18 are flow diagrams of example processes of PTT clients, according to further implementations.

The process of discarding traffic data packets from a transmitting PTT client that is not the expected current floor holder is depicted in FIG. 13. In FIG. 13, it is assumed that a first PTT sub-group includes PTT clients A, B, and C, and that a second PTT sub-group includes PTT clients P, Q, and R, and that at least one of the first and second PTT sub-groups originally has lost WAN connectivity. PTT clients A, B, C, P, Q, and R are members of an overall PTT group.

Task 1302: In the first PTT sub-group, an ongoing media burst is transmitted by PTT client B for receipt by PTT clients A and C.

Task 1304: In the second PTT sub-group, an ongoing media burst is transmitted by PTT client Q for receipt by PTT clients P and R.

Task 1306: WAN connectivity is restored and the first and second PTT sub-groups re-merge into a single PTT group.

Task 1308: The media burst of PTT client B continues but the transmitted packets from PTT client B now propagate also to PTT clients P, Q and R.

Task 1310: The media burst of PTT client Q continues but the transmitted packets from PTT client Q now propagate also to PTT clients A, B and C.

Task 1312: PTT clients A, B and C detect that traffic data packets of PTT client Q are received on the destination multicast IP address of the PTT group, but that the source IP address on which these packets are being received is different from that of PTT client B. In some examples, the source and destination IP addresses of a received traffic data packet can be passed as metadata up the protocol stack to an RTP layer, at which point it can be determined that the packet is a speech frame and that the source IP address is different to that of the current floor holder. In response, PTT clients A, B, and C discard the traffic data packets from PTT client Q.

Task 1314: PTT clients P, Q, R perform a task similar to task 1312 to discard traffic data packets from PTT client B.

Task 1316: PTT client B finishes its media burst.

Task 1318: As a result of the PTT client finishing its media burst and no longer being the current floor holder, all PTT clients (A, B, C, P, R) start receiving the traffic data packets from PTT client Q.

Solution C.2

With Solution C.2, when a receiving PTT client receives traffic data packets from multiple transmitting PTT clients, the receiving PTT clients discards the traffic data packets sent by a lower priority transmitting PTT client.

The relative priority of transmitting PTT clients in a PTT group can be preconfigured in the PTT clients of the PTT group. A PTT client transmitting traffic data can communicate its preconfigured priority with the traffic data in a number of alternative ways, one of which is via a Differentiated Services (Diffserv) setting. A Diffserv setting for a given traffic data packet can be specified by a Differentiated Services Code Point (DSCP) field in an IP the traffic data packet. For example, a receiving PTT client receiving two streams of traffic data packets can use the Diffserv settings of the received traffic data packets to decide which stream is a lower priority stream and hence which traffic data packets should be discarded.

In other examples, the preconfigured priority of a PTT client can be indicated by an extension header in RTP, in a new shim layer (carrying priority information) above the RTP layer, or by use of an RTCP application specific message.

In alternative examples, a lower priority transmitting PTT client can autonomously detect that it is of lower priority than another transmitting PTT client, and can use this information to cease transmission, to avoid wasted bandwidth. In such alternative examples, a receiving PTT client would not have to discard concurrently received traffic data packets from multiple transmitting PTT clients, since lower priority transmitting PTT client(s) would cease transmission upon detecting the respective lower priority relative to another transmitting PTT client.

If multiple transmitting PTT clients have the same priority, then such multiple same priority transmitting PTT clients can be ranked to select a "winning" transmitting PTT client. For example, the winning transmitting PTT client can be the PTT client that has the "highest" IP address. More specifically, in some examples, an IP address of a transmitting PTT client can be converted to an absolute number, such as according to the follow example:

PTT client P's IP address 123.234.23.1 maps to 123234023001, and

PTT client Q's IP address 123.234.23.5 maps to 123234023005.

Since 123234023005>123234023001, PTT client Q is selected as the winning PTT client.

Alternatively any other identifier of a transmitting PTT client can be used in similar manner, such as a ProSe UE ID, Wi-Fi MAC address, IMSI, etc.

5. Solution C.3: Hybrid Solution for Managing Multiple Media Bursts

Techniques or mechanisms according to Solution C.3 can be used to address Issue C discussed above.

Solution C.3 is a hybrid of Solutions C.1 and C.2 discussed above. With Solution C.3, a lower priority PTT client is forced to relinquish the floor but is granted a short period in which it can continue communication with its previous PTT sub-group (after merging of PTT sub-groups has occurred). For example, when PTT client A detects that it is currently transmitting a stream of traffic data packets, while in addition there is another PTT client B transmitting another stream of traffic data packets (which results in over-talking), and PTT client A has lower priority than PTT client B, then an application layer of PTT client A can provide an indication (e.g., an audio indication or a video indication) to its user to indicate that there is a short period (say 10 seconds or other time period) left in which to complete the media burst because another higher priority PTT client is currently transmitting. After expiry of this time period, PTT client A relinquishes the floor.

During the short time interval, other PTT clients in both the former PTT sub-groups can continue to listen to their respective speakers using Solution C.1, discussed above.

Figure 14:
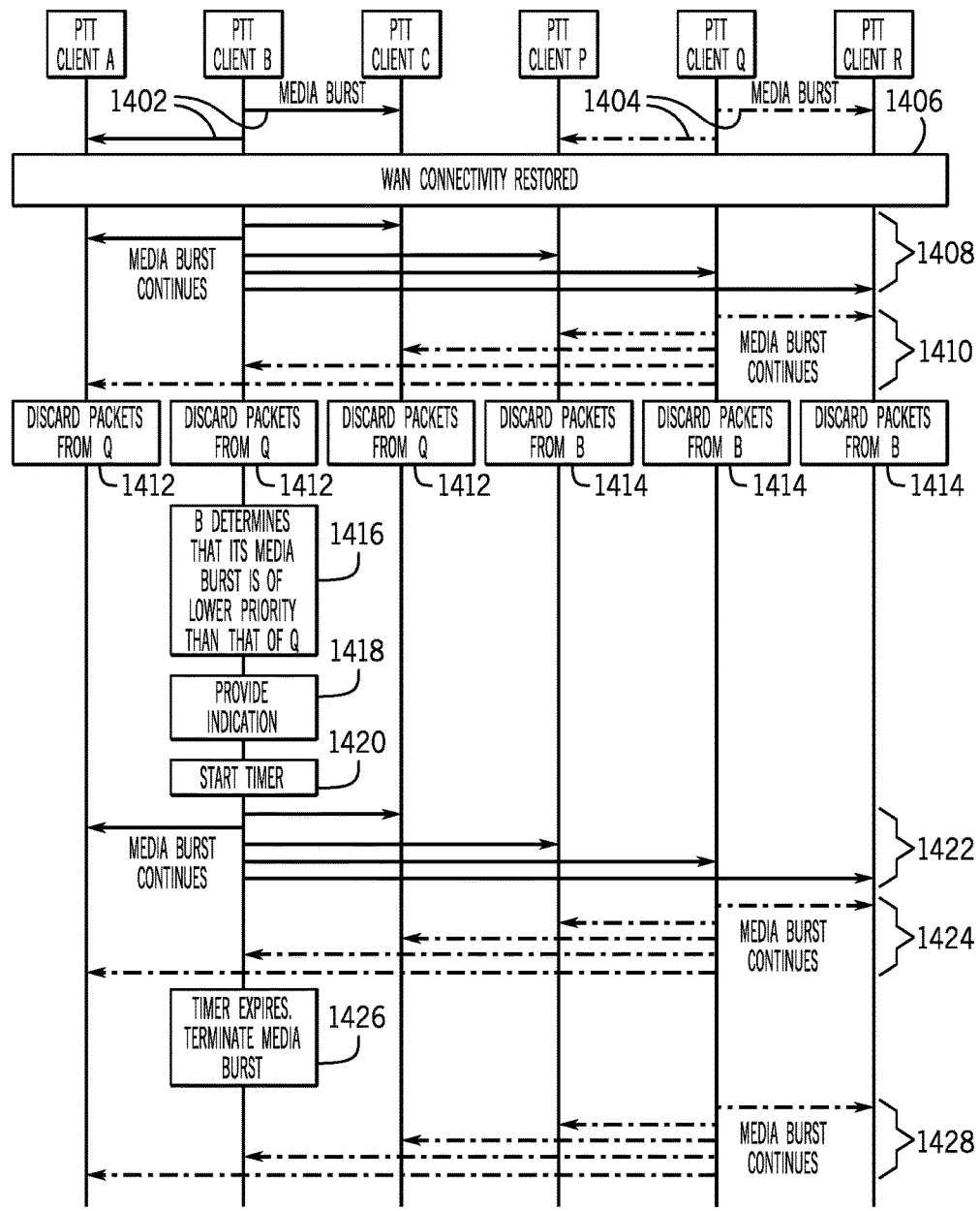

Solution C.3 is illustrated in FIG. 14.

In FIG. 14, it is assumed that there are two PTT sub-groups, a first PTT sub-group that includes PTT clients A, B, and C, and a second PTT sub-group that includes PTT clients P, Q, and R. At least one of the first and second PTT sub-groups may have lost WAN connectivity. The PTT clients A, B, C, P, Q, and R are members of an overall PTT group.

Task 1402: In the first PTT sub-group, an ongoing media burst is transmitted by PTT client B for receipt by PTT clients A and C.

Task 1404: In the second PTT sub-group, an ongoing media burst is transmitted by PTT client Q for receipt by PTT clients P and R.

Task 1406: WAN connectivity is restored and the first and second PTT sub-groups re-merge into a single PTT group.

Task 1408: The media burst of PTT client B continues, but the transmitted packets from PTT client B now propagate also to PTT clients P, Q, and R.

Task 1410: The media burst of PTT client Q continues with the transmitted packets from PTT client Q now propagate also to PTT clients A, B, and C.

Task 1412: Using solution C.1, PTT clients A, B, and C discard traffic data packets from PTT client Q.

Task 1414: Using solution C.1, PTT clients P, Q, and R discard traffic data packets from PTT client B.

Task 1416: PTT client B determines that its media burst has a lower priority than the media burst of PTT client Q.

Task 1418: PTT client B provides an indication to alert the user of PTT client B that the media burst of PTT client B will shortly be terminated, after some specified short time duration.

Task 1420: PTT client B starts a timer.

Task 1422: PTT client B continues to transmit media bursts, with PTT clients P, Q, and R using solution C.1 to discard traffic data packets of PTT client B.

Task 1424: PTT client Q continues to send traffic data packets, with PTT clients A, B, and C using solution C.1 to discard the traffic data packets from PTT client Q.

Task 1426: The timer expires in PTT client B, and as a result, PTT client B terminates its media burst. At this point, only PTT client Q continues to send its media burst, and PTT client B has ceased to transmit its media burst.

Task 1428: Since PTT client B has relinquished the floor, PTT clients A, B, and C can now receive and output the traffic data packets from PTT client Q.

6. Solution D.1: Handling Lack of Re-Synchronization in Floor Control State Machines in PTT Clients Techniques or mechanisms according to Solution D.1 can be used to address Issue D. These techniques or mechanisms can be used to prevent lack of synchronization among PTT clients due to re-merging of PTT sub-groups, or to handle a condition which synchronization is lost due to merging of PTT sub-groups.

Solution D.1 considers the specific case where a lack of synchronization in floor control state information occurs because of a merging of two formerly separate communication groups.

Solution D.1.1: For 3GPP Off-Network Solution

In the case of a distributed protocol solution based on the 3GPP off-network solution (e.g., the ProSe solution), then each of the two PTT clients (one each in the two formerly separate PTT sub-groups) would be token-holders that have their own floor request queue information (that would be different from one another).

With Solution D.1.1, a lower priority token holder PTT client (determined according to Solution C.2) transmits its floor request queue information to the higher priority token holder PTT client, where the transmitted floor request queue information is merged with the floor request queue information of the higher priority PTT client. In this solution, it can be specified that the higher priority PTT client will become the holder of the floor control token for the newly merged PTT group—note that after the lower priority PTT client has transmitted its floor request queue information to the higher priority PTT client, then just the higher priority PTT client will maintain the floor request queue. The lower priority PTT client will no longer have the floor request queue (i.e., it is no longer the token holder).

In some examples, the floor control queue information sent by the lower priority PTT client to the higher priority PTT client can be included in a Queue Position Information message. The destination IP address of the Queue Position Information message can be derived from the source IP address of the higher priority PTT client. Relative priority of token holder PTT clients can be determined using techniques according to Solution C.2.

Figure 15:
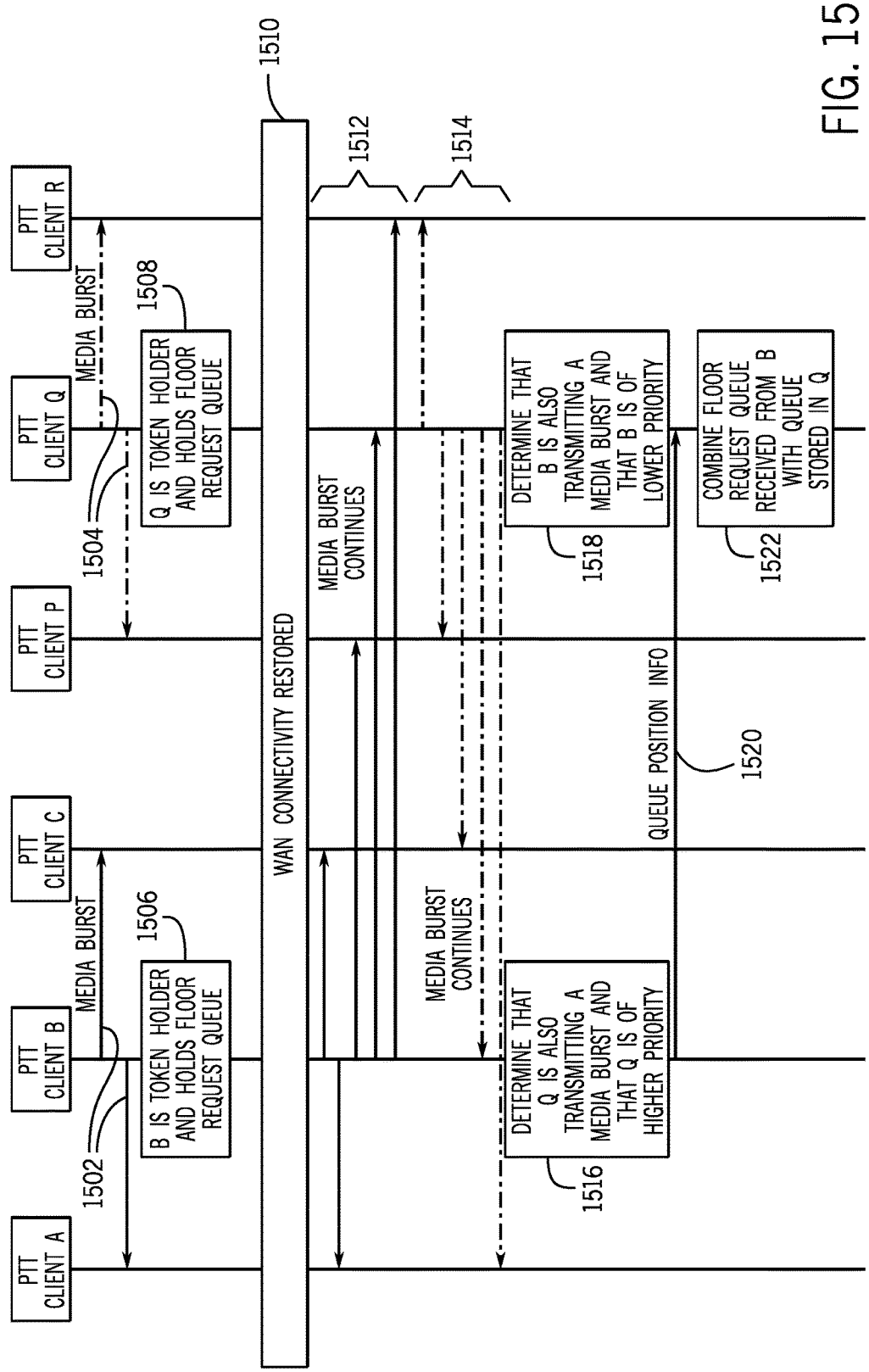

FIG. 15 shows an example of Solution D.1.1.

In FIG. 15, it is assumed that a first PTT sub-group includes PTT clients A, B, and C, and that a second PTT sub-group includes PTT clients P, Q, and R, and that at least one of the first and second PTT sub-groups originally has lost WAN connectivity. PTT clients A, B, C, P, Q, and R are members of an overall PTT group.

Task 1502: In the first PTT sub-group, an ongoing media burst is transmitted by PTT client B for receipt by PTT clients A and C.

Task 1504: In the second PTT sub-group, an ongoing media burst is transmitted by PTT client Q for receipt by PTT clients P and R.

Task 1506: PTT client B is the token holder of the first PTT sub-group, and maintains a floor request queue for the first PTT sub-group.

Task 1508: PTT client Q is the token holder for the second PTT sub-group, and maintains the floor request queue for the second PTT sub-group.

Task 1510: WAN connectivity is restored and the first and second PTT sub-groups re-merge into a single PTT group.

Task 1512: The media burst of PTT client B continues but the transmitted packets from PTT client B now propagate also to PTT clients P, Q and R.

Task 1514: The media burst of PTT client Q continues but the transmitted packets from PTT client Q now propagate also to PTT clients A, B and C.

Task 1516: PTT client B determines that PTT client queue is also transmitting a media burst, and that PTT client Q is of higher priority.

Task 1518: PTT client Q determines that PTT client B is also transmitting a media burst, and that PTT client B is of a lower priority.

Task 1520: In response to determining that PTT client Q that is concurrently transmitting a media burst with PTT client B has a higher priority, PTT client B transmits a Queue Position Information message to PTT client Q to send floor request Q information of PTT client B to PTT client Q.

Task 1522: PTT client Q combines the floor request queue information received from PTT client B with the pre-existing floor request queue information in PTT client Q.

Solution D.1.2: For Totally Distributed Control Solution

Where a totally distributed control solution is used (such as Solution A.1 or B.1), a PTT client (e.g., a Wi-Fi GO) of the PTT sub-group that has restored the WAN connectivity generates a floor control message (e.g., Floor Request Reset message) that informs all PTT clients of the PTT sub-group to delete or mark as invalid their queue information and to re-send Floor Requests.

Figure 16:
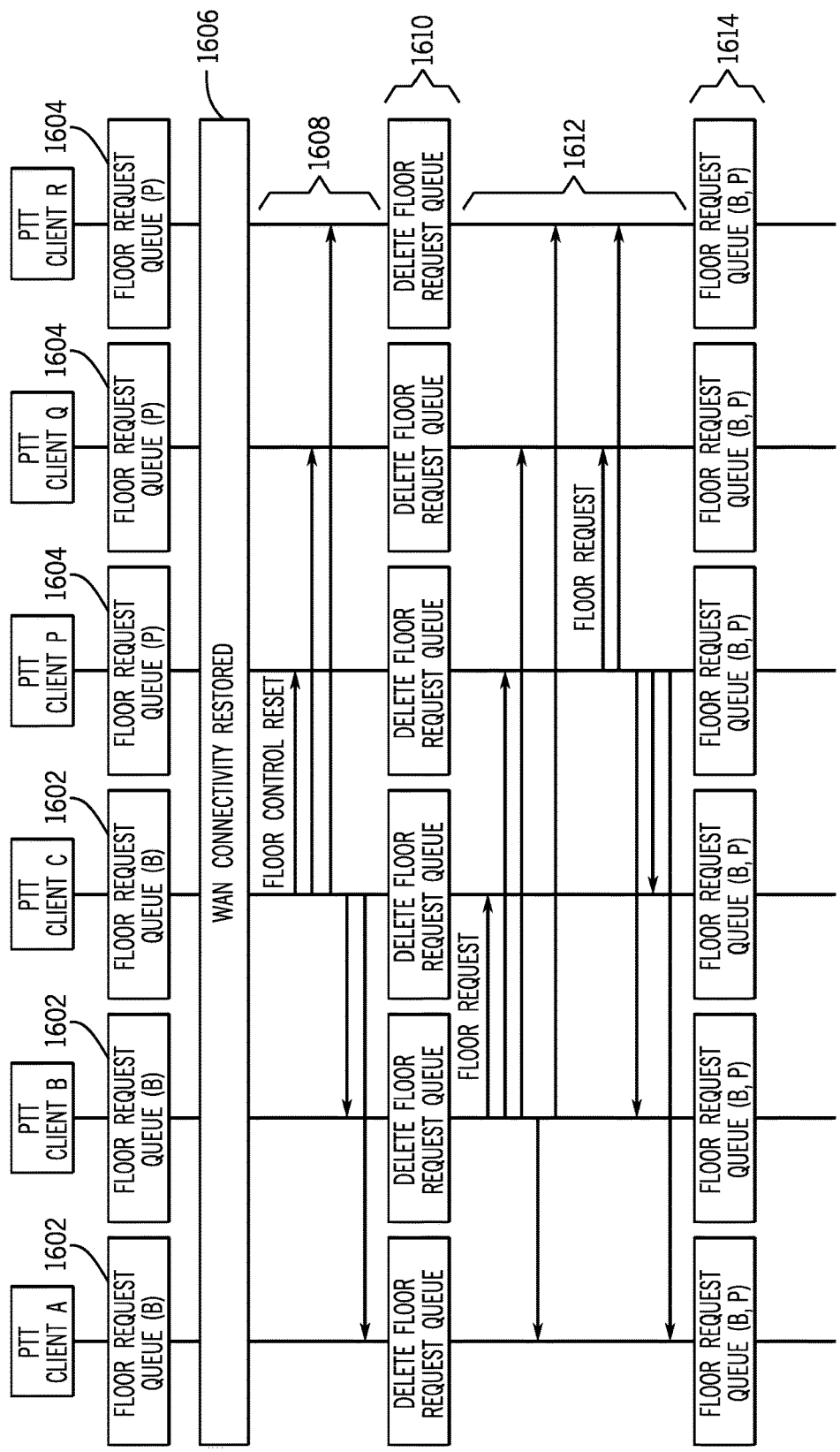

FIG. 16 shows an example of Solution D.1.2.

In FIG. 16, it is assumed that a first PTT sub-group includes PTT clients A, B, and C, and that a second PTT sub-group includes PTT clients P, Q, and R, and that at least one of the first and second PTT sub-groups originally has lost WAN connectivity. PTT clients A, B, C, P, Q, and R are members of an overall PTT group.

Task 1602: In the first PTT sub-group, PTT clients A, B, and C maintain identical floor control queues, which in this example includes just information related to the Floor Request for PTT client B.

Task 1604: In the second PTT sub-group, PTT clients P, Q, and R maintain identical floor control queues, which includes just information related to the Floor Request for PTT client P.

Task 1606: WAN connectivity is restored and the first and second PTT sub-groups re-merge into a single PTT group.

Task 1608: A PTT client (e.g., GO) of the first PTT sub-group whose WAN connectivity has been restored sends a Floor Control Reset message to all PTT clients in the PTT group using an IP multicast address.

Task 1610: In response to receiving the Floor Control Reset message, each PTT clients deletes or marks as invalid its floor control queue information.

Task 1612: PTT clients (e.g., B and P) that still wish to obtain the floor re-send their Floor Requests.

Task 1614: All PTT clients can rebuild their floor request queues based on received Floor Requests. In the example of FIG. 16, the rebuilt floor request queues contain information for PTT clients B and P.

As an alternative, whenever two PTT clients are transmitting at the same time, that can be taken as a possible indication that other PTT clients may also have un-synchronized floor control information. It can be then specified that this can be used as a trigger to re-synchronize floor control state machines. Either this can be done implicitly by all PTT clients (as soon as they start receiving two voice streams), or alternatively, the reset of floor request queue information can be triggered explicitly with a new Floor Request Reset message. The sender of the Floor Request Reset message can be identified as per Solution B.1 (where Tr is the time at which PTT clients start receiving two media streams).

7. Solution D.2: Re-Synchronization of Floor Control State Machines to Address Unreliable Transmission Techniques or mechanisms according to Solution D.1 can be used to address Issue D. With Solution D.2, floor request queue information in all PTT clients are periodically deleted or marked as invalid. For example, the periodic deletion or marking of invalid of floor request queue information can be aligned with or be at some multiple of the periodic Group Call Announcement messages.

After deletion or marking as invalid the floor request queue information, PTT clients re-send their Floor Requests to allow all PTT clients to rebuild and re-synchronise their floor request queues.

In some examples, Solution D.2 can be particularly targeted at the possible loss of synchronization in floor control state machines (stored floor request queue information) that may occur due to unreliable reception of Floor Request messages by PTT clients (e.g., due to use of IP multicast without acknowledgements).

It could be specified that this action to reset queues is to occur on reception of a periodic Group Call Announcement message, or some multiple thereof. As another alternative, a new periodic Floor Request Reset message can be specified. As another option, it can be specified that periodic Group Call Announcement messages are sent at some multiple of periodic Floor Request Reset messages. A technique for deciding which PTT client(s) would send such a message could be similar to that described for Solution B.1.

Figure 17:
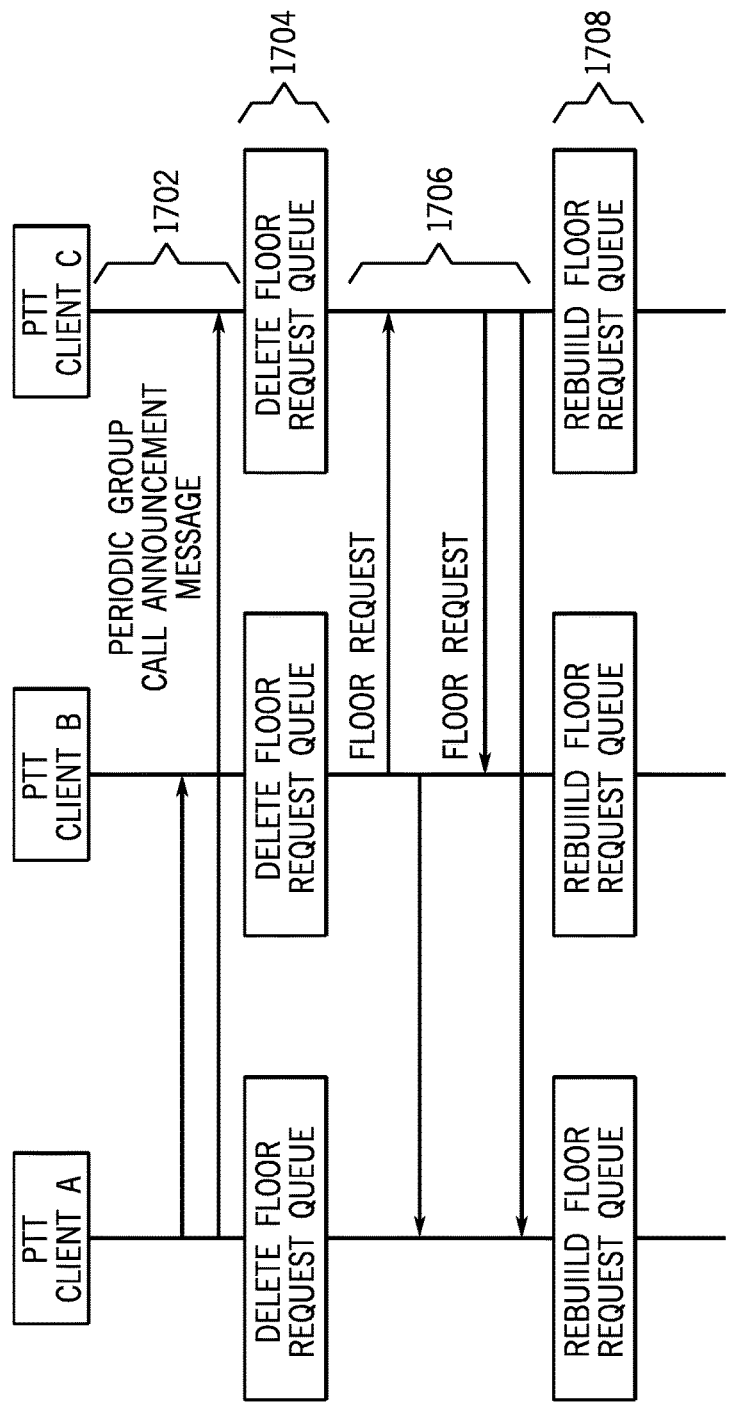

FIG. 17 illustrates an example of Solution D.2.

Task 1702: PTT client A sends a periodic Group Call Announcement message to the other members of the PTT group (which can be the overall PTT group or a PTT sub-group).

Task 1704: In response to the Group Call Announcement message, each of PTT clients A, B, and C deletes or marks as invalid its respective floor request queue. In other examples, the deletion or marking as invalid floor request queues of PTT clients A, B, and C can be performed in response to a different message as discussed above.

Task 1706: In response to the deleting or marking as invalid of the floor request queues, each PTT client that wishes to obtain the floor in the PTT group re-sends its Floor Request (in the example of FIG. 17, PTT clients B and C send their respective Floor Request messages).

Task 1708: In response to the Floor Request messages, PTT clients A, B, and C rebuild their respective floor request queues.

8. Solution E.1: Notifying Newly Joined PTT Group Members of Ongoing Group Call

Techniques or mechanisms according to Solution E.1 can be used to address Issue E discussed above.

Solution E.1 assumes that there is a PTT sub-group that has lost WAN connectivity. When WAN connectivity is restored and the PTT sub-group is merged with the larger PTT group, the PTT client responsible for re-establishing the WAN connectivity (e.g., a Wi-Fi Direct GO) sends a Group Call Probe message to the IP multicast address of the PTT group.

In response to the Group Call Probe message, one of the PTT clients of the PTT group (determined according to Solution B.1 discussed above) that is engaged in the group call responds with a Group Call Announcement message.

Alternatively, it can be specified that the PTT client that responds with the Group Call Announcement message is the PTT client that is currently transmitting traffic data, or alternatively, the PTT client that is currently a token holder.

The Group Call Announcement message provides information (e.g., media codecs, etc.) useable by the PTT sub-group that has restored WAN connectivity to join the PTT session of the PTT group. In this way, all PTT group members of the merged PTT group are synchronized with the appropriate group call information.

In the event that there were ongoing group calls in both of the PTT sub-groups, then multiple PTT clients can respond with Group Call Announcement information. The assumption in some examples is that the information of the Group Call Announcement messages from the multiple PTT clients is the same (based on pre-configuration of the PTT group) and hence there is no ambiguity in group call information at a receiving PTT client.

Figure 18:
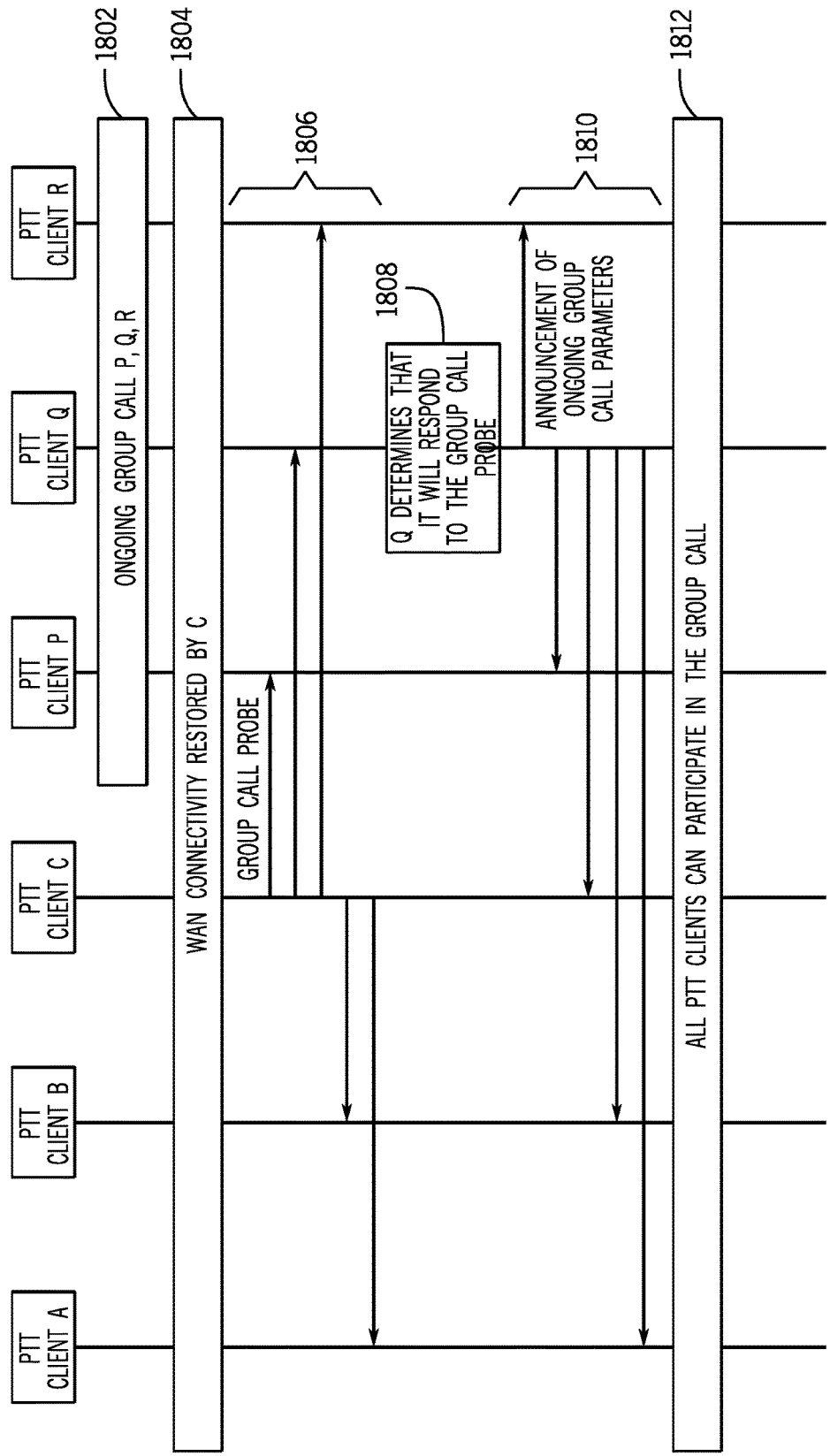

FIG. 18 is a flow diagram of Solution E.1 according to some examples.

Task 1802: In this example there is an ongoing group call between PTT clients P, Q and R that are part of a PTT sub-group, such as the PTT sub-group on the fixed network.

Task 1804: WAN connectivity is restored and PTT clients A, B, C which were part of another sub-group (e.g., a Local Area Radio Communication group) now become connected to PTT clients P, Q, R that are on the fixed network. PTT client C is responsible for restoring WAN connectivity (e.g., PTT client C can be a Wi-Fi Direct GO).

Task 1806: PTT client C (which knows that WAN connectivity has just been restored) sends a Group Call Probe message (using IP multicast).

Task 1808: PTT client Q determines that it will respond to the Group Call Probe message, such as by using Solution B.1.

Task 1810: PTT client Q transmits a Group Call Announcement message to supply ongoing group call parameters of the group call.

Task 1812: Using the ongoing group call parameters, all PTT clients of the PTT group (including the PTT clients of the sub-group that has just restored WAN connectivity) can participate in the group call.

8. System Architecture

Figure 19:
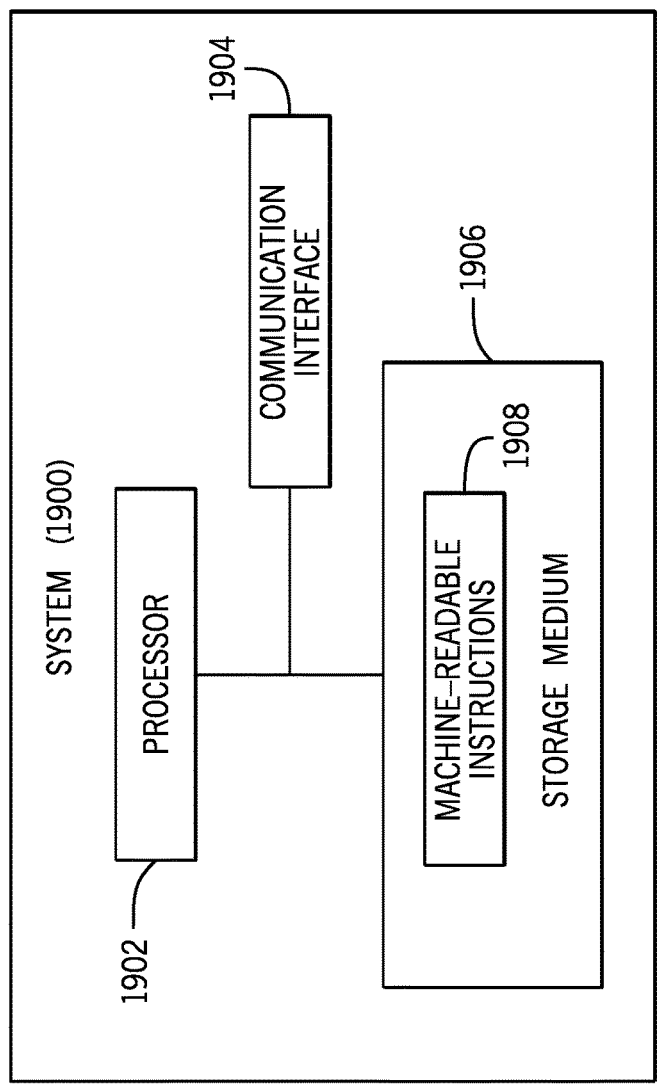
FIG. 19 is a block diagram of an example system according to some implementations.

FIG. 19 is a block diagram of a system 1900, which can be a PTT client (such as a user device) or a network node. The system 1900 includes a processor (or multiple processors) 1902, which can be coupled to a non-transitory machine-readable or computer-readable storage medium 1906, and a communication interface 1904 to perform communications, including wired or wireless communications, with another device. A processor can include a microprocessor, a core of a multi-core microprocessor, a microcontroller, a programmable integrated circuit, a programmable gate array, or another hardware processing circuit.

The storage medium 1906 stores machine-readable instructions 1908 that are executable on the processor(s) 1902 to perform respective tasks. The storage medium 1906 can include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
performing, by a first push-to-talk (PTT) client that has access to a wide area network (WAN), distributed control for a PTT session in conjunction with distributed control for the PTT session performed by another PTT client in the PTT session, the distributed control by the first PTT client performed without use of any PTT server;
maintaining, by the first PTT client, a queue of information relating to floor requests received from other PTT clients in a PTT group, the queue maintained by the first PTT client being the same as queues of the other PTT clients in the PTT group;
detecting, by the first PTT client, that no traffic data has been received from a further PTT client associated with a floor request having a highest priority for a specified time period; and
in response to the detecting, promoting a priority of a floor request having a next highest priority in the queue.

2. The method of claim 1, wherein the distributed control performed by the first PTT client is selected from among floor control, control of the PTT session, and management of traffic data of multiple PTT clients for the PTT session.

3. The method of claim 1, further comprising:
storing, in the queue maintained by the first PTT client, priority indications associated with the floor requests, the priority indications indicating relative priorities of the floor requests;
using, by the first PTT client, the priority indications to determine whether the first PTT client has a floor in the PTT session.

4. The method of claim 1, further comprising:
rebuilding, by the first PTT client, the queue of floor requests responsive to a condition indicating that connection to at least one PTT client in the PTT group has been lost due to loss of access to the WAN.

5. The method of claim 4, wherein the rebuilding is in response to one of:
detecting that at least one PTT client associated with a floor request in the queue has failed to take a floor in the PTT session, or
receiving, by the first PTT client from another PTT client, an indication of loss of access to the WAN.

6. The method of claim 1, further comprising:
detecting, by the first PTT client, transmission of a group call message by another PTT client in a PTT group; and
deciding, by the first PTT client, to not transmit the group call message in response to the detecting.

7. The method of claim 1, further comprising:
calculating, by the first PTT client, a time offset based on an identifier associated with the first PTT client, wherein the time offset calculated by the first PTT client is different from a time offset calculated by a second PTT client in the PTT group; and
in response to receiving a Group Call Probe message from another PTT client, transmitting, by the first PTT client, a Group Call Announcement message after waiting the time offset calculated by the first PTT client.

8. The method of claim 1, further comprising:
in response to detecting concurrent receipt, in the PTT session, of first traffic data transmitted by a second PTT client and second traffic data transmitted by a third PTT client,
discarding, by the first PTT client, the first traffic data, and
outputting the second traffic data at the first PTT client.

9. The method of claim 8, wherein the discarding of the first traffic data is in response to determining that the first traffic data includes an identification that is not an identification of a current floor holder.

10. The method of claim 8, wherein the discarding of the first traffic data is in response to determining that the first traffic data is from the second PTT client that is associated with a lower priority than a priority associated with the third PTT client.

11. The method of claim 1, further comprising:
detecting, by the first PTT client that is transmitting first traffic data in the PTT session, concurrent receipt of second traffic data transmitted by a second PTT client in the PTT session;
determining, by the first PTT client, that the first PTT client is associated with a lower priority than a priority of the second PTT client; and
continuing, by the first PTT client, to transmit the first traffic data until expiration of a specified time interval.

12. The method of claim 1, further comprising:
causing synchronization, by the first PTT client, of the queue at the first PTT client with a queue containing information relating to floor requests at a second PTT client.

13. The method of claim 12, wherein the causing of the synchronization comprises:
detecting, by the first PTT client, a condition indicating that plural PTT clients have un-synchronized floor control information; and
in response to the detecting, transmitting, by the first PTT client, an indication to the other PTT clients to delete or mark as invalid the queues containing information relating to floor requests at the other PTT clients, and to re-transmit floor requests by the other PTT clients.

14. The method of claim 13, wherein the detecting comprises one of:
detecting, by the first PTT client, restoration of access to the WAN after access to the WAN has been lost, or
detecting, by the first PTT client, concurrent receipt of traffic data for the PTT session from at least two PTT clients.

15. A method comprising:
performing, by a first push-to-talk (PTT) client that has access to a wide area network (WAN), distributed control for a PTT session in conjunction with distributed control for the PTT session performed by another PTT client in the PTT session, the distributed control by the first PTT client performed without use of any PTT server;

maintaining, by the first PTT client, a queue of information relating to floor requests received from other PTT clients in a PTT group, the queue maintained by the first PTT client being the same as queues of the other PTT clients in the PTT group; and for at least two floor requests in the queue associated with priority indications indicating a same priority, ranking the at least two floor requests using further indications associated with the at least two floor requests.

16. A first push-to-talk (PTT) client comprising:

a communication interface to communicate wirelessly with other PTT clients in a PTT session; and at least one processor configured to:

perform, while the first PTT client has access to a wide area network (WAN), distributed control for the PTT session in conjunction with distributed control for the PTT session performed by another PTT client in the PTT session, the distributed control by the first PTT client performed without use of any PTT server;

maintain a queue of information relating to floor requests received from other PTT clients in a PTT group, the queue maintained by the first PTT client being the same as queues of the other PTT clients in the PTT group;

detect that no traffic data has been received from a second PTT client associated with a floor request having a highest priority for a specified time period; and in response to the detecting, promote a priority of a floor request having a next highest priority in the queue.

17. The first PTT client of claim 16, wherein the at least one processor is configured to further perform distributed control for a PTT session when the first PTT client is without access to the WAN.

18. A non-transitory machine-readable storage medium storing instructions that upon execution causing a first push-to-talk (PTT) client to:

perform, while the first PTT client has access to a wide area network (WAN), distributed control for a PTT session in conjunction with distributed control for the PTT session performed by another PTT client in the PTT session, the distributed control by the first PTT client performed without use of any PTT server;

maintain a queue of information relating to floor requests received from other PTT clients in a PTT group, the queue maintained by the first PTT client being the same as queues of the other PTT clients in the PTT group;

detect that no traffic data has been received from a second PTT client associated with a floor request having a highest priority for a specified time period; and in response to the detecting, promote a priority of a floor request having a next highest priority in the queue.

* * * * *